US012108762B2

(12) United States Patent
Maitra et al.

(10) Patent No.: US 12,108,762 B2
(45) Date of Patent: Oct. 8, 2024

(54) METHODS OF CONTROLLING CROP PESTS USING AROMATIC AMIDE INSECT REPELLENTS, METHODS OF MAKING AROMATIC AMIDE INSECT REPELLENTS, AND NOVEL AROMATIC AMIDE INSECT REPELLENTS

(71) Applicants: Santanu Maitra, Clovis, CA (US); David Lent, Fresno, CA (US); Jacob Guerra, Visalia, CA (US); Peter Robles, San Mateo, CA (US)

(72) Inventors: Santanu Maitra, Clovis, CA (US); David Lent, Fresno, CA (US); Jacob Guerra, Visalia, CA (US); Peter Robles, San Mateo, CA (US)

( * ) Notice: Subject to any disclaimer, the term of this patent is extended or adjusted under 35 U.S.C. 154(b) by 251 days.

(21) Appl. No.: 17/377,022

(22) Filed: Jul. 15, 2021

(65) Prior Publication Data

US 2022/0071213 A1 Mar. 10, 2022

Related U.S. Application Data

(60) Provisional application No. 63/075,649, filed on Sep. 8, 2020.

(51) Int. Cl.
*A01N 43/60* (2006.01)
*A01N 25/04* (2006.01)

(52) U.S. Cl.
CPC .............. *A01N 43/60* (2013.01); *A01N 25/04* (2013.01)

(58) Field of Classification Search
CPC ..................................................... A01N 43/60
See application file for complete search history.

(56) References Cited

U.S. PATENT DOCUMENTS

| 7,662,972 | B2 * | 2/2010 | Mita | C07C 251/48 548/240 |
| 7,893,092 | B2 * | 2/2011 | Jeanguenat | A01N 43/56 514/599 |
| 9,439,434 | B2 * | 9/2016 | Woods | A01N 65/36 |

FOREIGN PATENT DOCUMENTS

| CN | 103242189 A | 8/2013 | |
| WO | WO-2013092350 A1 * | 6/2013 | A01N 41/10 |
| WO | WO-2013092943 A1 * | 6/2013 | A01N 43/80 |
| WO | WO-2014064093 A1 * | 5/2014 | A01N 37/34 |
| WO | WO-2014100206 A1 * | 6/2014 | A01N 37/46 |

OTHER PUBLICATIONS

Johnson et al. (Topical mosquito repellents II. Repellent potency and duration in ring-substituted N,N-dialkyl- and -aminoalkylbenzamides; Journal of Medicinal Chemistry (1968), 11, 1265-8), CODEN: JMCMAR; ISSN: 0022-2623). (Year: 1968).*
Zhu Zhibo, Cai Yun, Yang Jie, Li Xianglian, Li Runming, Liu Shuwen; "Inhibitory activities of 3-trifluoromethyl benzamide derivatives against the entry of H5N1 influenza viruses," J South Med Univ, 2014, 34(7): 961-964.
Kalyanasundaram, M.; Mathew, Nisha; Paily, K. P.; Prabakaran, G.; "Synthesis and screening of 1-methyl-4-substituted benzoyl piperazides against adult Setaria digitata for antifilarial activity," Acta Tropica, 2009, vol. 111, Issue 2, pp. 168-171.
Lysen, Morten; Kelleher, Susan; Begtrup, Mikael; Kristensen, Jesper Langgaard; "Synthesis of tertiary benzamides via Pd-catalyzed coupling of arylboronic esters and carbamoyl chlorides," Journal of Organic Chemistry, 2005, vol. 70, Issue 13, pp. 5342-5343.
Johnson, Howard L.; Skinner, W. A.; Skidmore, D.; Maibach, H. I.; "Topical mosquito repellents II. Repellent potency and duration in ring-substituted N,N-dialkyl- and -aminoalkylbenzamides," Journal of Medicinal Chemistry, 1968, vol. 11, pp. 1265-1268.
Jenkins, E., and Hines, R.: "Fruit Crop Pest Management: A Guide for Commercial Applicators Category 1C," Extension Bulletin E-2891, Oct. 2003; Michigan State University Extension, E. Lansing, MI.
V.V. Krishnan, Salvador Vazquez, Kalyani Maitra, Santanu Maitra; "Restricted amide rotation with steric hindrance Induced multiple conformations," Chemical Physics Letters, vol. 689, Dec. 1, 2017, p. 148; Abstract only.
V.V. Krishnan, William B. Thompson, Joy J. Goto, Kalyani Maitra, Santanu Maitra; "Modulations in restricted amide rotation by steric induced conformational trapping," Chemical Physics Letters, vol. 523, Jan. 27, 2012, p. 124; Abstract only.
Kekeli Ekoue-Kovi and Christian Wolf; "Metal-Free One-Pot Oxidative Amination of Aldehydes to Amides," Organic Letters, 2007, vol. 9, No. 17, pp. 3429-3432.

(Continued)

*Primary Examiner* — Snigdha Maewall
(74) *Attorney, Agent, or Firm* — Andrew D. Fortney; Central California IP Group, P.C.

(57) ABSTRACT

Methods of protecting fruit crops from flying insect pests and of repelling flying insects using aromatic amide compounds are disclosed. The methods apply the compounds to various surfaces, such as the fruit crops, the ground or structures adjacent to the fruit crops, or an object, article, human skin or animal. The compounds have the formula $R_xC_6H_y$—C(=O)—N(Cy), where $R_xC_6H_y$ is a substituted phenyl group, each R group is independently $C_1$-$C_6$ alkyl, substituted $C_1$-$C_4$ alkyl, (substituted) $C_6$-$C_{10}$ aryl, $C_1$-$C_4$ alkoxy, $C_6$-$C_{10}$ aryloxy, halogen, nitro, cyano, cyanate, isocyanate, nitroso, $C_1$-$C_4$ alkylthio, phenylthio, (halogen-substituted) $C_1$-$C_4$ alkylsulfonyl, phenylsulfonyl, tolylsulfonyl, amino, mono- or di-$C_1$-$C_4$ alkylamino, diphenylamino, di-$C_1$-$C_4$ alkylamido, formyl, $C_2$-$C_7$ acyl, or $C_1$-$C_6$ alkoxycarbonyl; x is an integer of 1 to 5; x+y=5; Cy is a $C_2$-$C_8$ (substituted) alkadiyl, a $C_4$-$C_6$ (substituted) alkenediyl, or a (substituted) diyl of the formula —($CH_2CH_2$)—O—($CH_2CH_2$)—, —($CH_2CH_2$)—NR'—($CH_2CH_2$)— or —($CH_2CH_2$)—S—($CH_2CH_2$)— that, along with the amide N atom, forms a non-aromatic cyclic group; and R' is $C_1$-$C_6$ alkyl, substituted $C_1$-$C_4$ alkyl, (substituted) $C_6$-$C_{10}$ aryl, or (substituted) benzyl.

20 Claims, 10 Drawing Sheets

(56) References Cited

OTHER PUBLICATIONS

Lingling Wang, Min Yu, Chaolong Wu, Nan Deng, Chao Wang, and Xiaoquan Yao; "Synthesis of Ag/g-C3N4 Composite as Highly Efficient Visible-Light Photocatalyst for Oxidative Amidation of Aromatic Aldehydes," Adv. Synth. Catal. 2016, 358, pp. 2631-2641; Wiley-VCH Verlag Gmbh&Co. KGaA, Weinheim, Germany.

Guerra, Jacob; "Amide Bond Modulation: Partial Amide Bond Rotation in Cyclic Amines of Deet Analogs Follow an Enthalpy-Entropy Compensation (EEC)," Master's thesis submitted to California State University, Fresno in Aug. 2018 and published (made available online) on Jun. 3, 2020.

\* cited by examiner

METHODS OF CONTROLLING CROP PESTS USING AROMATIC AMIDE INSECT REPELLENTS, METHODS OF MAKING AROMATIC AMIDE INSECT REPELLENTS, AND NOVEL AROMATIC AMIDE INSECT REPELLENTS

RELATED APPLICATION(S)

This application claims priority to U.S. Provisional Pat. Appl. No. 63/075,649, filed on Sep. 8, 2020, incorporated herein by reference.

FIELD OF THE INVENTION

The present invention generally relates to the field(s) of insect repellents and crop protection. More specifically, embodiments of the present invention pertain to novel compounds for pest control, particularly for fruit pest control, and methods of making and using the same.

DISCUSSION OF THE BACKGROUND

Spotted Wing Drosophila (SWD), formally known as *Drosophila suzukii*, is a close relative of the common vinegar fly or *Drosophila melanogaster*. Unlike the common fly, SWD is a major pest in the USA, primarily in some of the western coastal states, such as California, Oregon and Washington. SWD has been rapidly moving into inland states, such as Michigan, Minnesota, Colorado, Mississippi and Pennsylvania, among others, as well as spreading in Europe and other Asian countries. SWD flies feed on healthy fruits such as various berries, peaches, grapes, nectarines, cherries, and other fruits. The crop loss in California according to a decade-old survey was on the order of $460 million, and the destruction has been worsening since then. There is a tremendous need for the development of a remedy.

The management of SWD can be multifaceted: trapping, biological means, and use of chemicals are major pathways to neutralize the adverse effects of SWD on healthy fruit growth. Chemical methodology adopts two major approaches: development of pesticides to eradicate the pest completely, or incorporation of repellents to keep the pest at bay to save the crop from harm. Several insecticides are used to kill SWD, including organophosphates, acetamiprids, cyantraniliprole, spinosad, and pyrithroids. These are often toxic to beneficial insects like bees, as well as to humans, fish, birds, and some amphibians.

For example, chlorpyrifos is a phosphate-based insecticide that kills SWD. However, sales of chlorpyrifos to California growers have been banned, and California growers cannot possess or use it after Dec. 31, 2020. Hawaii has already banned chlorpyrifos, and New York is phasing it out. Common insecticides used for SWD include acetamiprid, cyantraniliprole, pyrethroids, and spinosad. Acetamiprid is highly toxic to birds and somewhat toxic to aquatic creatures including fish. It is also known to be toxic to humans, causing cancer, infertility, and other dysfunctions. Cyantraniliprole is highly toxic to bees, which is a major concern and a threat or potential threat to various state ecosystems. Pyrethroids are also toxic to bees and dragonflies, and mildly toxic to fish and few other invertebrates. Spinosoids (of which spinosad is an example) and spinosyns are biological insect-killing agents; however, they are also very toxic to bees.

N,N-diethyl-m-toluamide or DEET is a common mosquito repellent, and it and its analogs may also repel fruit flies. DEET is a light yellow viscous oil containing an amide bond as the sole functional group. To the best of the inventors' knowledge, DEET has been the sole insect repellent in the market since its discovery >60 years ago. However, DEET has several drawbacks, such as some human toxicity, an unpleasant smell, a relatively short time of effectiveness (primarily for mosquitos), its ability to dissolve plastics (which can be a challenge for packaging and for some applications), and the insects' gradual habituation to it. DEET also has a relatively high cost for agricultural applications, an unknown mechanism of action, and its effectiveness varies unpredictably for some fruit flies, especially SWD. DEET can be irritating to sensitive parts of the body, and it is a suspected environmental pollutant, and is linked to a possible decrease in cell viability. Recently, at the level of receptor binding, DEET has been identified specifically as an odorant showing an affinity for the odorant receptor CquiOR136 of the southern house mosquito *Culex quinquefasciatus*.

An amide is a common functional group that is derived from an acyl group bonded to a nitrogen atom. Amides have unique structural properties in that the contributing resonance structures produce a hybrid structure, resulting in the nitrogen atom being mostly $sp^2$ hybridized and adopting a trigonal planar geometry, as shown in part in FIG. 1. Resonance occurs when the nitrogen atom's lone pair of electrons delocalizes onto the carbonyl group, in effect lowering the overall internal energy of the system. Resonance is due to a π-conjugated system. Rotation about the C—N bond in an amide has a unique energy barrier due to the extent of resonance. Fast or slow exchange between equilibrium conformations occurs with low or high activation energy barriers, respectively. Molecular collisions do not contribute to the likelihood of overcoming energy barriers, so chemical exchange between conformations is strictly a first order process. To overcome the rotational energy barrier of the C—N amide bond, a sufficient amount of ambient thermal energy must be present to break the amide π-bond. In natural settings, ambient thermal energy does not supply enough energy to overcome the barrier to rotation, which is generally around 63-84 kJ/mol for simple amides.

Information from cross-peaks to the diagonal in the EXSY spectrum yield valuable information about chemical exchange between methylene protons (N—$CH_2$—) in DEET isomers, for example, in terms of the transfer of spin magnetization during mixing time in the pulse sequence (see FIG. 2). Chemical shift ranges of interest in DEET analogs relative to amide bond character are in the 3.2 to 3.6 ppm range. The methylene groups (—$CH_2$—) bonded to the nitrogen atom are responsible for these chemical shifts and yield information about amide bond magnitude and the number of equilibrium conformations present.

Hindered rotation about single bonds due to steric interactions leads to atropisomers, or chemically distinct rigid conformations that are trapped because the full rotation of a particular bond is not energetically reasonable or favorable. Loss of structural symmetry incorporates chirality in the molecule despite the absence of typical chiral carbon atoms. Rotation that is restricted due to a surmountable energy barrier manifests itself as a coalescence point in NMR spectra as the temperature increases. The energy differences in rotation from one conformation to another are great enough to trap single conformations, creating a mixture of diastereomers. Further, using variable temperature NMR spectroscopy, dynamic processes are detected when proton nuclei exchange from one chemical environment to another on a time scale that is short enough to cause NMR line-shape broadening (see FIG. 3). Variable temperature NMR simply varies the temperature (e.g., from colder to warmer temperature) in a single experiment, and chemical exchange patterns and respective energy barriers can be determined from the array of spectra.

FIG. 3 shows an example of dynamic NMR spectra, specifically two-site chemical exchange relative to the difference in frequency between chemical shifts. AV is the difference in frequency ($s^{-1}$), $k_{ex}$ is the exchange rate, and T is the temperature. Rotational energy barriers and available ambient thermal energy reflects coalescence of the two peaks at 3.75 and 4.05 ppm at relatively low temperatures (reflecting the different chemical environments in the diastereomer) to a single peak at 3.9 ppm, where the exchange of protons between the different chemical environments occurs faster than the NMR resonance frequency.

Induced diastereotopicity of the methylene groups (—$CH_2$—) adjacent to the amide N atom occurs due to barriers in rotation that are heavily influenced by electronic and steric factors, in addition to interactions with solvent. In the case of DEET, such rotation yields virtually the same structures. Therefore, rotation around the C—N bond of DEET and its dialkylamido analogs yield virtually identical species.

o-DEET (see FIG. 4B) has an additional higher-energy barrier producing a third conformation due to sterically induced conformational trapping. Amide bond rotational energy barrier manipulation due to electronic effects of neighboring substituents in DEET analogs has also been demonstrated. There are two barriers to rotation defined by dihedral angles φ (C—C—C—O [aromatic C=O]) and χ (O—C—N—C; see FIGS. 4A-B, which show m-DEET and o-DEET, respectively). The energy barrier to rotation around p is eclipsed relative to that of χ. This big difference in energy barrier to rotation is due to the magnitude of the (C—N) partial double bond. Steric interactions in o-DEET (FIG. 4B) cause a third higher-energy barrier. These steric interactions are removed in m-DEET (FIG. 4A). These are the same two methylene groups in each compound, but o-DEET exhibits diastereotopicity.

Specifically to the aryl amide framework of DEET, ortho-position substituents tend to interfere with the planarity of the amide bond structure and prevent π orbital overlap from occurring due to steric interactions between the ortho-substituent and the carbonyl oxygen relative to the φ dihedral. Altering the size of the substituent in the ortho-position causes an increase or decrease in the magnitude of both φ and χ rotational energy barriers. Relative to the χ dihedral, the alkyl chain length of the amine can also reduce or prevent planarity in the structure and reduce π orbital overlap due to an increase in the degrees of freedom of the longer alkyl chains. Empirically speaking, when π orbital overlap is reduced or prevented, it results in less double bond character and an associated increase in chemical exchange rate. Integration of the methylene peaks (adjacent to the amide nitrogen atom) in NMR spectra of such compounds show that the energy barrier between a two-site exchange is low, as there is an approximately equal stereoisomer population distribution.

The EXSY spectra of FIG. 2 shows coalescing peaks of m-DEET in the chemical shift range around 3.4 ppm. The EXSY spectrum of o-DEET shows the third peak at 3.2 ppm as a non-coalescing peak. Further, based on the exchanging cross peaks in the EXSY spectrum for o-DEET, steric interactions are the basis for the third higher-energy barrier.

This simple alteration from a meta to an ortho position on the benzene ring changed the molecular landscape significantly.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention follows the repellent pathway, which is much more harmless than pesticides due to the potential for greater side effects (such as toxicity) of pesticides on all living entities. The present insect repellents are based on one or more structural motifs of DEET, and are not insecticides and do not have toxic or hazardous effects on living systems. Specifically, the present DEET analogs (structurally modified DEET) have been evaluated for their repellence capability toward fruit flies.

Thorough olfactory (smell), gustatory (taste), and habituation assays have identified a number of lead compounds from a library of DEET analogs that are much superior to DEET in terms of fruit fly repellence (based on the olfactory and gustatory assays). Moreover, unlike DEET, fruit flies do not get habituated to these compounds.

The present invention provides compounds that may circumvent the issues and problems with DEET and lead to successful development of an effective, relatively non-toxic insect (e.g., fruit fly, SWD, etc.) repellent. The synthesis of the compounds is simple, inexpensive, and fast.

In one aspect, the present invention concerns a method of protecting fruit crops from flying insect pests, comprising applying an aromatic amide compound having a formula $R_xC_6H_y$—C(=O)—N(Cy) to the fruit crops or to ground or structures adjacent to the fruit crops. In the formula, $R_xC_6H_y$ is a substituted phenyl group; each R group is independently selected from $C_1$-$C_6$ alkyl, substituted $C_1$-$C_4$ alkyl, $C_6$-$C_{10}$ aryl, substituted $C_6$-$C_{10}$ aryl, $C_1$-$C_4$ alkoxy, $C_6$-$C_{10}$ aryloxy, halogen, nitro, cyano, cyanate, isocyanate, nitroso, $C_1$-$C_4$ alkylthio, phenylthio, $C_1$-$C_4$ alkylsulfonyl (which may be substituted with 1 to 2n+1 halogen atoms, where n=a number of C atoms in the $C_1$-$C_4$ alkyl group), phenylsulfonyl, tolylsulfonyl, amino, mono-$C_1$-$C_4$ alkylamino, di-$C_1$-$C_4$ alkylamino, diphenylamino, di-$C_1$-$C_4$ alkylamido, formyl, $C_2$-$C_7$ acyl, or $C_1$-$C_6$ alkoxycarbonyl; x is an integer from 1 to 5; x+y=5; Cy is a $C_2$-$C_8$ substituted or unsubstituted alkadiyl, a $C_4$-$C_6$ substituted or unsubstituted alkenediyl, or a substituted or unsubstituted diyl of the formula —($CH_2CH_2$)—O—($CH_2CH_2$)—, —($CH_2CH_2$)—NR'—($CH_2CH_2$)— or —($CH_2CH_2$)—S—($CH_2CH_2$)—, that, along with the N atom in the amide group in the formula, forms a substituted or unsubstituted non-aromatic cyclic group; and R' is $C_1$-$C_6$ alkyl, substituted $C_1$-$C_4$ alkyl, substituted or unsubstituted $C_6$-$C_{10}$ aryl, or substituted or unsubstituted benzyl. Because of the relatively low toxicity of many of the aromatic amide compounds, the compounds can be applied directly to the fruit crops to keep flying insect pests such as fruit flies (e.g., of the genus *Drosophila*) away from the crops.

In various embodiments, the compound is applied by spraying a solution or suspension of the compound on the fruit crops, the ground, or the structures. The solution or suspension may comprise the aromatic amide compound in water. The concentration of the aromatic amide compound in water may be in the range of 0.1-1000 g/L, although the invention is not so limited.

Certain aromatic amide compounds may be more effective, or easier or less expensive to make, than others. For example, in the aromatic amide compounds used in the present method, x may be 1 or 2. In other or further examples, each R may be $C_1$-$C_6$ alkyl, $C_1$-$C_4$ alkyl substituted with 1 to 2n+1 halogen atoms (where n=the number of C atoms in the $C_1$-$C_4$ alkyl group), $C_1$-$C_4$ alkoxy, halogen, nitro, cyano, $C_1$-$C_4$ alkylthio, $C_1$-$C_4$ alkylsulfonyl (which may be substituted with 1 to 2n+1 halogen atoms), amino, mono-$C_1$-$C_4$ alkylamino, or di-$C_1$-$C_4$ alkylamino. In more specific examples, x is 1 and/or each R is $C_1$-$C_4$ alkyl, trifluoromethyl, $C_1$-$C_4$ alkoxy, fluoro, chloro, nitro, or amino. Also, while the R group(s) may be at any position on the aromatic ring, in certain preferred compounds, R is at an o-position or an m-position.

Alternatively or additionally, Cy, together with the amide N atom (i.e., the N atom in the —C[=O]—N group), forms a mono- or polycyclic heterocycle selected from the group consisting of pyrrolidine, pyrimidine, 1,2,3-trihydroindole, 1,2,3-tetrahydroisoquinoline, decahydroquinoline, decahydroisoquinoline, tetrahydropyrazine, morpholine, thiomorpholine, hexahydroazepine, azocane and azonane. In preferred examples, Cy together with the amide N atom forms a pyrrolidine, pyrimidine, tetrahydropyrazine, or morpholine ring. In certain examples, Cy is unsubstituted. In other examples, Cy is substituted with one or more (e.g., 1 or 2) $C_1$-$C_6$ alkyl, halogen-substituted $C_1$-$C_4$ alkyl, substituted or unsubstituted $C_6$-$C_{10}$ aryl, substituted or unsubstituted benzyl, $C_1$-$C_4$ alkoxy, halogen, nitro, amino, mono-$C_1$-$C_4$ alkylamino, or di-$C_1$-$C_4$ alkylamino groups.

Another aspect of the present invention concerns a method of repelling flying insects, comprising applying the aromatic amide compound of the formula $R_xC_6H_y$—C(=O)—N(Cy) to an object, article, human skin or animal. For example, the aromatic amide compound can, in many cases, be applied in concentrated or dilute formulations directly to the skin of a human or animal in need or protection against flying insects, such as mosquitoes and gnats. Alternatively, the compound or formulation can be applied (e.g., by spraying) to clothing, screens or other barriers for enclosures, and other surfaces in environments in which it is desired to keep such flying insects and insect pests away.

Yet another aspect of the present invention concerns compounds having the formula $R_xC_6H_y$—C(=O)—N(Cy), wherein: $R_xC_6H_y$ is a substituted phenyl group, each R group is independently selected from $C_2$-$C_6$ alkyl, substituted $C_1$-$C_4$ alkyl, $C_6$-$C_{10}$ aryl, substituted $C_6$-$C_{10}$ aryl, $C_2$-$C_4$ alkoxy, $C_6$-$C_{10}$ aryloxy, nitro, cyano, cyanate, isocyanate, nitroso, $C_1$-$C_4$ alkylthio, phenylthio, $C_1$-$C_4$ alkylsulfonyl (which may be substituted with 1 to 2n+1 halogen atoms, where n=the number of C atoms in the $C_1$-$C_4$ alkyl group), phenylsulfonyl, tolylsulfonyl, amino, mono-$C_1$-$C_4$ alkylamino, di-$C_1$-$C_4$ alkylamino, diphenylamino, di-$C_1$-$C_4$ alkylamido, formyl, $C_2$-$C_7$ acyl, or $C_1$-$C_6$ alkoxycarbonyl; x is an integer of from 1 to 5; x+y=5; Cy is a $C_2$-$C_8$ substituted or unsubstituted alkadiyl, a $C_4$-$C_6$ substituted or unsubstituted alkenediyl, or a substituted or unsubstituted diyl of the formula —(CH$_2$CH$_2$)—O—(CH$_2$CH$_2$)—, —(CH$_2$CH$_2$)—NR'—(CH$_2$CH$_2$)— or —(CH$_2$CH$_2$)—S—(CH$_2$CH$_2$)—, that, along with the amide N atom, forms a substituted or unsubstituted non-aromatic cyclic group; and R' is $C_1$-$C_6$ alkyl, substituted $C_1$-$C_4$ alkyl, substituted or unsubstituted $C_6$-$C_{10}$ aryl, or substituted or unsubstituted benzyl, except that when Cy is —(CH$_2$)$_4$—, or —(CH$_2$)$_5$—, R is not nitro or cyano, and when Cy is —(CH$_2$CH$_2$)—O—(CH$_2$CH$_2$)—, R is not nitro, cyano, phenyl or amino.

In various embodiments of the compound, x may be 1 or 2, and R may be $C_2$-$C_6$ alkyl, $C_1$-$C_4$ alkyl substituted with 1 to 2n+1 halogen atoms (where n=the number of C atoms in the $C_1$-$C_4$ alkyl group), $C_1$-$C_4$ alkyl substituted with a $C_1$-$C_4$ alkoxy group, $C_2$-$C_4$ alkoxy, halogen, $C_1$-$C_4$ alkylthio, $C_1$-$C_4$ alkylsulfonyl (which may be substituted with 1 to 2n+1 halogen atoms), amino, mono-$C_1$-$C_4$ alkylamino, or di-$C_1$-$C_4$ alkylamino. In other or further embodiments, each R may be at an o-position or an m-position. Alternatively or additionally, each R may be an electron-withdrawing group.

In the present compound, Cy, together with the amide N atom, may form a mono- or polycyclic heterocycle selected from the group consisting of pyrrolidine, pyrimidine, 1,2,3-trihydroindole, 1,2,3-tetrahydroisoquinoline, decahydroquinoline, decahydroisoquinoline, tetra-hydropyrazine, morpholine, thiomorpholine, hexahydroazepine, azocane and azonane. For example, Cy together with the amide N atom can be an unsubstituted pyrrolidine, pyrimidine, tetrahydropyrazine, or morpholine ring.

A still further aspect of the present invention concerns a method of making the present aromatic amide compound, comprising reacting an aromatic carboxylic acid having the formula $R_xC_6H_y$—C(=O)—OH with a chlorinating agent to form an aromatic carboxylic acid chloride having the formula $R_xC_6H_y$—C(=O)—Cl, and subsequently reacting the aromatic carboxylic acid chloride with an amine having the formula H—N(Cy) to form the aromatic amide compound. In one example, the chlorinating agent is thionyl chloride, although other chlorinating agents (e.g., oxalyl chloride, sulfur dichloride, phosphorus oxychloride, phosphorus trichloride, phosphorus pentachloride) may also be acceptable.

The present invention reduces the need for insecticides to control various insect pests in the agriculture industry and elsewhere, and creates a potent, safe, efficacious, and inexpensive insect repellent. The present repellents may partially or completely eradicate the use of insecticides to control SWD and other fruit flies.

The shape of a pest-repellent molecule may be important or even critical for insect repellent activity. In general, whether artificial or natural, the shape of the small molecule in a small molecule-macromolecule interaction is important when the small molecule binds, disrupts, or aids protein function in a living system. The binding or the specific interaction between the ligand or inhibitor (e.g., small molecule) or agonist or antagonist (e.g., protein) depends on the precise 3-dimensional shape of the protein (or other macromolecule), or more specifically, the protein's binding domain and that of the incoming small molecule agent. The restricted rotation about the amide bond in an aromatic amide can significantly affect its overall 3-dimensional shape or conformation, thus potentially playing a crucial role in its binding with the target protein in the pest. Therefore, the conformational analysis of aromatic amides, along with their biological screening (e.g., of all such compounds or a focused library of such compounds) may identify particularly useful and/or effective insect repellants.

If amide-containing compounds can be designed and synthesized to exhibit a certain geometry and/or shape, then the ability to design insect repellent compounds with the same or better biological activity than DEET is attainable. For example, there is a need for mosquito repellents with increased efficacy, as DEET's efficacy is only five hours. One such application is to repel blood-feeding insects that carry diseases such as malaria and yellow fever. Recent research efforts have concentrated on developing new drugs and vaccines against the parasites that cause these diseases, even to the extent of creating mosquito vector transgenesis for the production of mosquitoes that are incapable of parasitic infection. However, successful attempts at decreasing malaria and yellow fever transmission often involve methods targeting reduction in the frequency of contact between blood-feeding insects and their human targets.

The method of controlling crop pests and other biological effects of the present aromatic amides is novel, and some of the molecules may be novel as well. The economic potential of the present invention is significant, since problems caused by SWD and other fruit flies have led to hundreds of millions of dollars of losses in the agriculture industry in California, Oregon and Washington alone. Thus, the present invention carries tremendous potential value as an insect (and, more specifically, a fruit fly or SWD) repellent.

DETAILED DESCRIPTION

Figure 1:
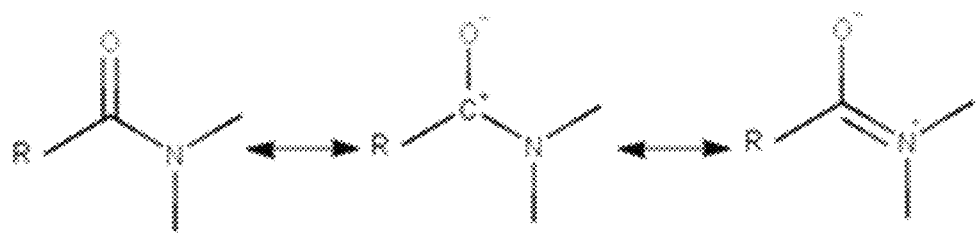
FIG. 1 shows resonance structures for an amide.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

A DEET-like structure, an easy two-step synthesis, inexpensive chemicals, reduced material needs, and a less-intensive method of application should make the present invention both inexpensive and safe. The present invention utilizes the less-explored repellent pathway, which is safer than pesticides due to the potentially reduced side effects of repellents on living things.

The present inventors have synthesized libraries of over 100 DEET analogs. The present disclosure includes an approach to the design and/or synthesis of DEET analogs, an evaluation of their biological activity, and a field study (i.e., entomology) of representative compounds. DEET and its analogs possess some inherent structural features, such as restricted amide bond rotation. The structure or shape of a specific compound is believed to be important in its biological function(s). Therefore, the new compounds may be defined in part by their shape(s). The present compounds were tested for their repellent effects on fruit flies using olfactory, gustatory, and habituation assays.

The present compounds possess unique structural properties, with a semi-rigid amide bond resulting in restricted rotation and unique three-dimensional shapes. Knowledge of the shape of biologically active molecules may be important, as molecular shape often dictates biological function. The present compounds have a general formula $R_xC_6H_y$—C(=O)—N(Cy) (see FIG. 5) are promising commercial fruit fly and SWD repellents. In the general formula, "$R_xC_6H_y$," refers to a substituted phenyl group, each R group is independently selected from $C_1$-$C_6$ alkyl, substituted $C_1$-$C_4$ alkyl, $C_6$-$C_{10}$ aryl, substituted $C_6$-$C_{10}$ aryl, $C_1$-$C_4$ alkoxy, $C_6$-$C_{10}$ aryloxy, halogen, nitro, cyano, cyanate, isocyanate, nitroso, $C_1$-$C_4$ alkylthio, phenylthio, $C_1$-$C_4$ alkylsulfonyl (which may be substituted with 1 to 2n+1 halogen atoms, where n=the number of C atoms in the $C_1$-$C_4$ alkyl group), phenylsulfonyl, tolylsulfonyl, amino, mono- and di-$C_1$-$C_4$ alkylamino, diphenylamino, di-$C_1$-$C_4$ alkylamido, formyl, $C_2$-$C_7$ acyl (i.e., a group of the formula —C[=O]—$C_nH_{2n+1}$, where n is an integer of 1-6), or $C_1$-$C_6$ alkoxycarbonyl (i.e., a group of the formula —C[=O]—O—$C_nH_{2n+1}$, where n is an integer of 1-6); x is an integer of from 1 to 5 (e.g., 1-3 or any integer or range of integers of from 1 to 5); x+y=5; and Cy is a $C_2$-$C_8$ substituted or unsubstituted alkadiyl, a $C_4$-$C_6$ substituted or unsubstituted alkenediyl, or a substituted or unsubstituted diyl of the formula —(CH$_2$CH$_2$)—O—(CH$_2$CH$_2$)—, —(CH$_2$CH$_2$)—NR'—(CH$_2$CH$_2$)— or —(CH$_2$CH$_2$)—S—(CH$_2$CH$_2$)— that, along with the N atom in the amide group shown in FIG. 2, forms a substituted or unsubstituted non-aromatic cyclic group. For example, the Cy group together with the N atom in the amide group may form a mono- or polycyclic heterocycle selected from pyrrolidine, pyrimidine, 1,2,3-trihydroindole, 1,2,3-tetrahydroisoquinoline, decahydroquinoline, decahydroisoquinoline, tetrahydropyrazine, morpholine, thiomorpholine, hexahydroazepine, azocane and azonane. The Cy group may be substituted with one or more $C_1$-$C_6$ alkyl (which may be substituted with from 1 to 2n+1 halogen atoms, n being the number of carbon atoms in the alkyl group), phenyl, tolyl, xylyl or $C_1$-$C_4$ alkoxy groups and/or one or more halogen atoms, or adjacent positions in the Cy ring may be substituted with a diyl group that forms an additional cyclic ring (e.g., a cycloalkane, cycloalkene, arene or heterocyclic ring). The substituted $C_1$-$C_4$ alkyl and $C_6$-$C_{10}$ aryl groups for the R substituent may be substituted with one or more halogen atoms or 1 or 2 (e.g., 1 in the case of $C_1$-$C_4$ alkyl and 1 or 2 in the case of) $C_1$-$C_4$ alkoxy groups. For example, $C_1$-$C_4$ alkyl groups may be substituted with 1-3 halogen atoms (e.g., trifluoromethyl, 2-chloroethyl) or 1 $C_1$-$C_4$ alkoxy group (e.g., 2-methoxyethyl), and $C_6$-$C_{10}$ aryl groups may be substituted with 1-5 halogen atoms (e.g., chlorophenyl, perfluorophenyl) or 1 or 2 $C_1$-$C_4$ alkoxy groups (e.g., o- or m-methoxyphenyl). The R groups may reside at an o-, m- or p-position on the phenyl ring, but o- and m-positions may be preferred. When 2 or more R groups are present, they can be at any possible combination of o-, m- and p-positions, but are preferably at either (i) o-positions or a combination of o- and p-positions or (ii) m-positions. In some embodiments, R is preferably an electron-withdrawing group, such as halogen (e.g., Cl, F). R' may be $C_1$-$C_6$ alkyl, substituted $C_1$-$C_4$ alkyl, substituted or unsubstituted $C_6$-$C_{10}$ aryl, or substituted or unsubstituted benzyl, where the substitutions are as described above.

Figure 2:
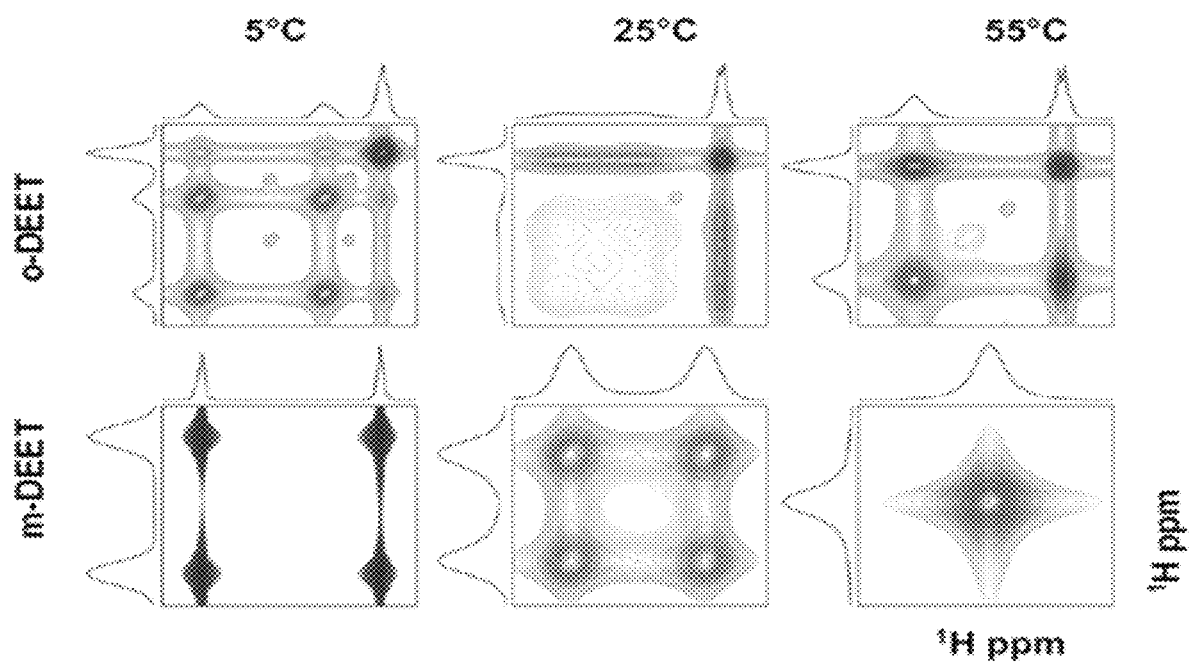
FIG. 2 shows the EXSY NMR spectra of a-methylene protons (N—CH$_2$—) in ortho- and meta-DEET isomers.

The present inventors have produced ~100 compounds of the above formula and having the structure shown in FIG. 2. Biological screening of about half of these compounds against fruit flies has revealed a number of lead molecules. Smell, taste, and habituation assays have generated reproducible data leading to the discovery of novel repellent compounds that are not only much more potent than DEET in repelling the flies, but the flies do NOT habituate to the molecules (unlike DEET). Additional syntheses of new rational and logically designed molecules (e.g., new lead generation) molecules structurally similar to promising lead compounds (lead optimization) is underway, and is within the level of skill in the applicable art(s). Biological evaluations, field studies, toxicological studies and commercialization processes can be conducted as described herein and/or in accordance with the knowledge of those skilled in the applicable art(s).

A small, organic molecule-based insect repellent can provide a real-world solution to the rampant infestation of SWD flies in California fruit farming and elsewhere, and can provide a much safer, more convenient, and inexpensive alternative to trapping and toxic chemical remedies/solutions. DEET is not only the quintessential mosquito repellent, but also a universal repellent for other insects, including regular fruit flies (*Drosophila melanogaster*). Unfortunately, DEET is not sufficiently potent for consideration as a SWD repellent. However, DEET's generally non-toxic profile lends weight to the expectation that aromatic amides in general are environmentally friendly and relatively non-toxic. The present compounds may also repel mosquitoes and other insect pests, flying and non-flying, and thus create a "better DEET."

Studying the hindered rotation about the C—N amide bond can produce insights in molecular design. Amide bonds affect overall molecular conformation due to their dynamic partial double bond character. It is believed that electronic and steric interactions of substituents in an amide-containing molecule should also have some effect on amide bond character, given that the amide bond has both a sigma bond and a π bond. The ability to thermodynamically adjust or "fine tune" molecular conformations may be possible if influences or contributions from intramolecular electronic forces (e.g., by induction and/or resonance), steric hindrances, and rotational energy barriers can be quantified.

Using semi-quantitative methods, the extent of exchange between chemical/structural conformations can be determined using NMR signal line-shape analysis and exchange spectroscopy (EXSY). These same rotational energy barriers can be quantitatively determined using molecular modeling programs (e.g., Gaussian 03W) that can deduce from hypothetical data the number and magnitude of energy barriers to rotation relative to potential energy.

Thermodynamic contributions affecting amide bond rotation due to single variable changes in aryl N,N-diethylamides were studied to evaluate the size, position and electronic effects of ortho substituents on the aromatic ring. Similar, but unique, trapped higher energy conformations were found in such compounds. Utilizing the same techniques as in the study of o- and m-DEET, including the same resolution, substituents were primarily selected based on electron donating and withdrawing capabilities (i.e., inductive effects). Table 1 below shows the effects of various ortho substituents.

TABLE 1

Energy trapping for ortho-substituents of varying sizes and inductive/resonance effects.

| Substituent | State (m.p. if solid) | Trapped Site? | Inductive Effect | Resonance Effect |
| --- | --- | --- | --- | --- |
| chloro | Liquid | Yes | + | + |
| trifluoromethyl | Liquid | Yes | − | −− |
| methoxy | Crystals (41-43° C.) | No | + | ++ |
| fluoro | Liquid | Maybe | ++ | + |
| nitro | Crystals (62-64° C.) | Yes | − | + |
| methyl | Liquid | Yes | − | − |
| hydrogen | Liquid | No | − | − |

The results from variable temperature NMR and EXSY experiments suggest that the energy barrier for amide bond rotation can be modulated. The inductive and resonance effects of the substituents on amide partial double bond character were rationalized based on empirical activation energies, where + and ++ means that there was an increasing inductive or resonance effect (through σ and π bonds, respectively), and—had the opposite effect. Curiously, relative to its van der Waals size and potential for steric interactions, the methoxy group does not raise the energy required for rotation. While the a-methylene group exchanging between three sites except for that of o-methoxy substituted According to these results, if electron density is introduced into the system, amide bond free rotation is more favorable. However, in this same ortho analog series, methoxy and fluorine substitutions had similar activation energies. Fluorine is electron withdrawing and was expected to result in more double bond character in the amide bond, because the nitrogen's lone pair electron density should be pulled towards the aromatic ring, but the electron-donating methoxy group has similar activation energy for amide C—N bond rotation.

Molecular potential energy surface (PES) scans were analyzed to estimate the magnitude of energy barriers to C—N amide rotation. In this case, relative energy barriers for each dihedral angle, φ(C—C—C—O [aromatic C=O]) and χ(O—C—N—C), were cycled 360° in steps of 10°. In the case of the o-fluorine DEET analog, the lowest energy conformation was planar, with the carbonyl group allowing for pi orbital overlap. It is believed that electron density is pulled away from the amide bond by inductive means, causing a reduction in the energy barrier to rotation.

Further, inductive and resonance effects of each substituent were separately analyzed and determined in ortho, meta, and para positions on the benzene ring. Substituents placed in a resonance-contributing location had more effect on the activation energy of the amide bond, but inductive effects were best determined in the inductive-contributing meta position of the benzene ring. Thus, differentiation between inductive and resonance effects allows for more control over rotation of the C—N amide bond. In the present disclosure, the inductive substituent effects are isolated by removing steric interactions with the cyclic amine (—NCy in FIG. 5) to determine net thermodynamic contributions.

In the present invention, a thermodynamic evaluation of meta-substituted and ortho-substituted cyclic amine DEET analogs provides information useful for determining favorable and/or modulatable molecular conformations. Thermodynamic principles can explain observations in NMR spectra. Substitution of cyclic amines for diethyl amine in DEET reduces the steric interactions of the substituents on the amine. Cyclic amines are understood to decrease the molecular degrees of freedom and limit the distribution of internal energy in the molecule, causing an increase in the transition state activation enthalpy. Consequently, electron-withdrawing substituents on the phenyl ring raise the activation enthalpy of the rotational transition state, and electron-donating substituents on the phenyl ring lower the activation enthalpy of the transition state.

Molecular electronic properties using computational methods show that oxygen functional groups are important for repellency, but the electronic properties of the amide group dictate and determine repellency efficacy. Further, functional groups attached to the carbonyl group and the amine nitrogen greatly influence the electronic properties of the amide. There is a balance between these functional groups in the odorant molecule (i.e., repellent) relative to polarity and the amide bond. A guideline for synthesis and repellent efficacy of DEET analogs based on these electronic properties may include one or more of the following ranges: a maximum positive potential of 16.2-21.1 kcal/mol, a maximum negative potential of −75.0 to −73.1 kcal/mol, a dipole moment of 3.25-3.82 Debye, and atomic charges at the carbonyl oxygen atom, carbonyl carbon, and amide nitrogen of −0.55 to −0.50e, 0.50 to 0.68e, and −0.51 to −0.30e, respectively.

Synthesis of Aromatic Amides

A series of meta- and ortho-substituted cyclic amine DEET analogs were synthesized because these positions on the aromatic ring resemble the structure of DEET. However, para-substituents are also encompassed by the present invention, because such substituents also have inductive and resonance effects similar to ortho-substituents and, in some cases, meta-substituents. The substituents vary in size and electronic properties. Substituents at the meta position are expected to have no steric interactions with the carbonyl group, which will isolate steric interactions strictly to ortho-substituted analogs. The cyclic amine substitutions also vary in size and electronic properties. The size and type/nature of the cyclic amines vary from five-membered pyrrolidine to six-membered piperidine, morpholine, and 1-methylpiperizine (see Table 2 below), but the invention is not limited to these ring sizes or types. Overall, the activation enthalpy and entropy of the transition state for each analog was analyzed to determine the effects of the cyclic amines and aromatic substituents on the thermodynamics on the amide bond in aromatic amides of the structure shown in FIG. 5.

TABLE 2

Nomenclature for meta and ortho substituents and cyclic amines is synthesized aromatic amides.

| R/N-Cy | B | C | D | E |
|---|---|---|---|---|
| Meta-$CH_3$ 1m | 1mB | 1mC | 1mD | 1mE |
| Meta-F 2m | 2mB | 2mC | 2mD | 2mE |
| Meta-$CF_3$ 3m | 3mB | 3mC | 3mD | 3mE |
| Meta-$NO_2$ 4m | 4mB | 4mC | 4mD | 4mE |
| Meta-$OCH_3$ 5m | 5mB | 5mC | 5mD | 5mE |
| Meta-$NH_2$ 6m | 6mB | 6mC | 6mD | 6mE |
| Ortho-$CH_3$ 1o | 1oB | 1oC | 1oD | 1oE |
| Ortho-F 2o | 2oB | 2oC | 2oD | 2oE |
| Ortho-$CF_3$ 3o | 3oB | 3oC | 3oD | 3oE |
| Ortho-$NO_2$ 4o | 4oB | 4oC | 4oD | 4oE |
| Ortho-$OCH_3$ 5o | 5oB | 5oC | 5oD | 5oE |
| Ortho-$NH_2$ 6o | 6oB | 6oC | 6oD | 6oE |

A cyclic amine in the aromatic amide affects amide bond character by allowing less restricted rotation, and thus greater $\pi$ orbital overlap and slower rotation rates. The activation enthalpy and activation entropy of each analog in Table 2 above has been quantitated, and these thermodynamic quantities have been correlated with empirical lineshapes in variable temperature NMR spectra. The optimized geometry of the present aromatic amides (or at least the N atom in the amide group and the C atoms to which it is bound) may therefore be relatively planar (e.g., with bond angles of from 1150 to 120°, or any range therein, as opposed to 108-109° for more full $sp^3$-hybridized N—C bonds), due to a higher magnitude of amide bond character, which should cause a decrease in entropy. Further, with higher magnitudes or degrees of amide bond character in the present aromatic amides, they should have higher activation energies for amide bond rotation.

The aromatic meta position is an inductive contributing location, and not a resonance contributing site. The resonance contributing sites are ortho and para, which have greater electronic impact overall through resonance. This allows for the analysis of electron density distribution by induction. Therefore, electron donating groups should slightly reduce amide bond character, and electron withdrawing groups should slightly enhance it.

General Methods and Materials

Figure 5:
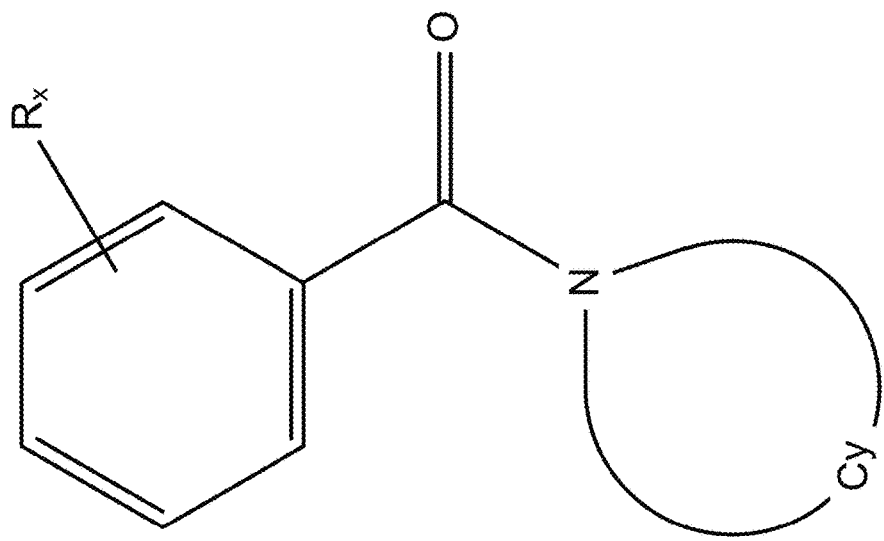
FIG. 5 shows a general structure for insect repellent compounds in accordance with the present invention.
Figure 3:
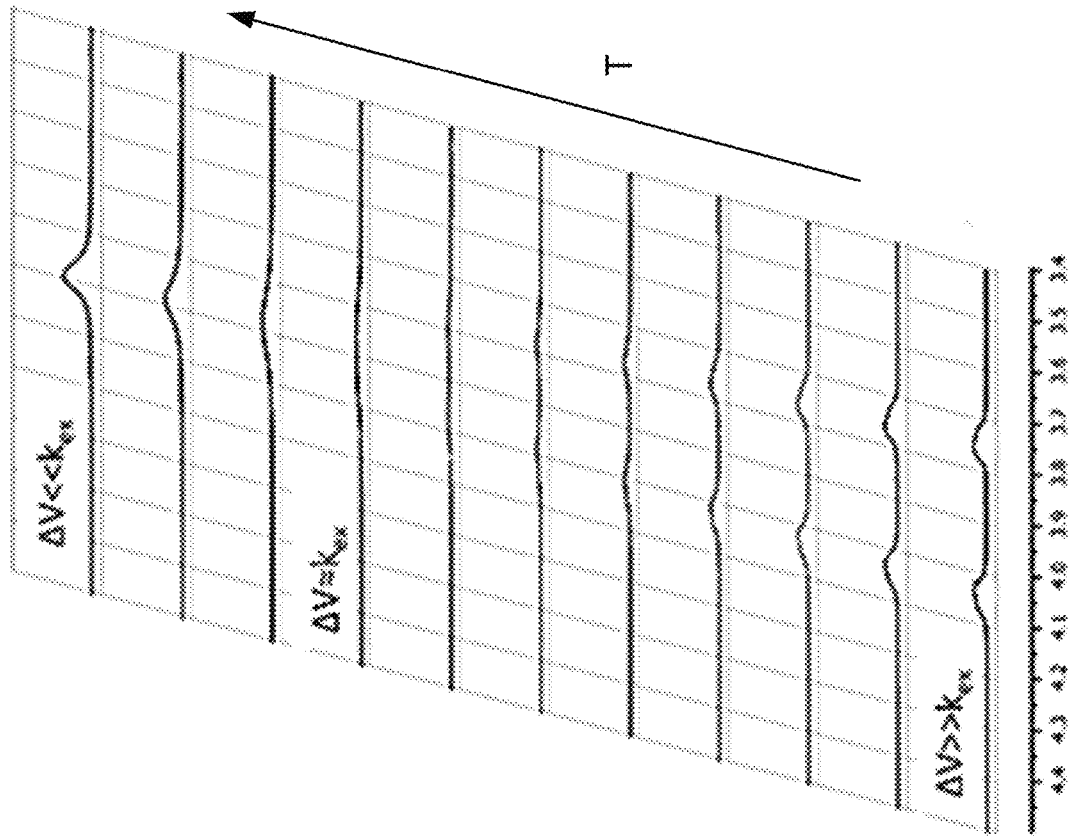
FIG. 3 shows an example of two-site chemical exchange in dynamic NMR spectra.
Figure 4A:
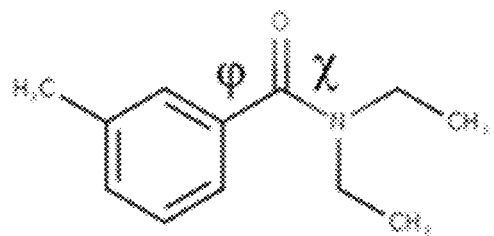
FIGS. 4A-B respectively show the chemical structures of m-DEET and o-DEET.
Figure 4B:
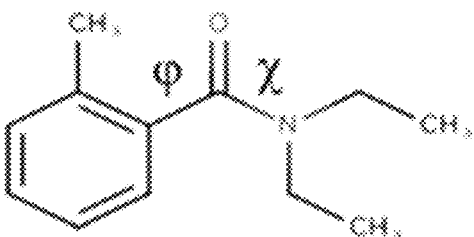
Figure 6:
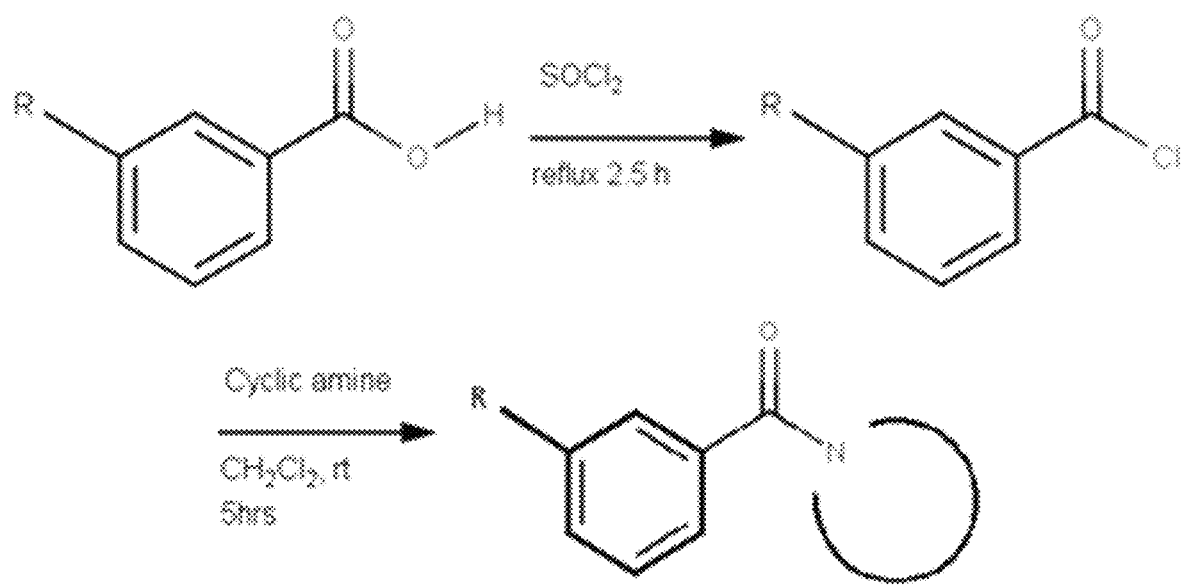
FIG. 6 shows a general synthetic scheme for making insect repellent compounds in accordance with the present invention.

Synthesis of the aromatic amides of FIG. 5 first involves the activation of an aromatic carboxylic acid into an acid chloride intermediate, and then reaction of the acid chloride with a cyclic amine. First, thionyl chloride (or another chlorinating agent) reacts with the carboxylic acid group and chlorinates the carbonyl group, producing the acid chloride and hydrochloric acid. The reaction of the acid chloride and the amine occurs by nucleophilic acyl addition. The reagents and starting materials for the reactions are commercially available. FIG. 6 shows this simple two-step procedure for making a meta-substituted aromatic amide, where the parent carboxylic acid is converted to the acyl chloride and then reacted with the cyclic amine of choice. The same procedure can be used for making ortho- and para-substituted aromatic amides, as well as multiply-substituted aromatic amides.

Thionyl chloride was distilled prior to use. Materials for synthesis of the aromatic amides: one hot plate, 25 mL round bottom flask, 10 mL graduated cylinder, transfer pipettes, stir bar, condenser, light-duty tissue paper, stand, clamp, rotary evaporator, silica gel IB-F 2.5×7.5 cm flexible sheets for thin layer chromatography, ultraviolet light source for fluorescence absorbance analysis, 25 mL separatory funnel, one 10 mL beaker, and one 50 mL beaker. Materials for purification by column chromatography: chromatographic grade silica gel desiccant 60-200 mesh, non-fritted 11"x2" column with stopcock, plastic funnel, 20 mL test tubes, and pressurized air. Materials for purification by performance-thin layer chromatography: Analtech silica gel GF 20×20 cm (2000 micron) uniplates and developing chamber.

The chemical reagents, solvents, and drying agents included thionyl chloride, methylene chloride, acetone, 1 M sodium hydroxide, 1 M hydrochloric acid, deionized water, brine solution, magnesium sulfate, hexane, ethyl acetate, and deuterated chloroform. Benzoic acid derivatives and cyclic amines can be easily purchased on the free market.

All aromatic amides were synthesized according to the following experiment, except for amino-substituted compounds (i.e., the 6m and 6o series in Table 2), and the reaction times for all ortho compounds were doubled.

1-Methyl-4-(3-methylbenzoyl)piperazine (1mE): A dry 25 mL round bottom flask was charged with 10 mL of distilled thionyl chloride (density: 1.635 g/mL) and m-toluic acid (0.4995 g, 3.667 mmol). The mixture was refluxed over high heat (hot plate surface temperature of 180° C.) for 2.5 h while stirring. Thionyl chloride was completely removed using reduced pressure at room temperature. Then 10 mL of $CH_2Cl_2$ was added and stirred at room temperature for 5 min. Excess N-methylpiperazine (0.5579 g, 5.570 mmol, 1.5 eq) was added dropwise over 5 min and stirred at room temperature for 5 h with a condenser. The addition of the amine produces a white gaseous cloud. The organic layer was washed with two portions of 10 mL 1M NaOH, 10 mL deionized water, 10 mL brine solution, and then dried over $MgSO_4$. The reaction was monitored by thin layer chromatography and characterized using NMR. The product required no purification and yielded a light brown viscous oil (0.6579 g, 82.15% yield) of 1-methyl-4-(3-methylbenzoyl)piperazine (1mE).

For amino based compounds (6mB-E and 6oB-E in Table 2 above), the corresponding nitrobenzoyl amide analog was first synthesized using the experiment described above, followed by a reduction reaction. The general reduction reaction is: to a dry 25 mL round bottom flask, approximately 0.50 g of nitro-substituted aromatic amide analog is added, followed by 12 mL reagent grade methanol and 2-5% (by weight) of a commercially-available Pd on C catalyst. A double oblique stopcock is then connected to the charged flask with one outlet to a vacuum pump, the other to a rubber balloon filled with hydrogen gas. The air in the system is purged with nitrogen, then with hydrogen, and the nitrogen/hydrogen purge cycle is repeated 3 times. The resulting reaction mixture is stirred under hydrogen gas overnight. The reaction is monitored using thin layer chromatography and analytical techniques. The catalyst is removed by vacuum filtration through tightly-packed celite (diatomaceous earth), and the celite cake is rinsed 5 times with aliquots of methanol. The methanol is removed under reduced pressure by rotary evaporation, and the target compound is purified using standard chromatography.

NMR Studies

All proton NMR experiments were performed using a 400-MHz ($^1H$ resonance frequency) VN-NMRS spectrometer (Varian-Agilent). Each compound was dissolved in $CDCl_3$ for a total volume of 0.60 mL and 75 mM in concentration. Each sample was glass-sealed using a freeze-thaw method where air was removed by vacuum after dipping in liquid nitrogen (2-3 cycles) and sealed using a propane torch. The temperature was calibrated using MeOH. Variable temperature NMR experimental temperatures ranged from 5 to 55° C., in steps of 5° C. The calibrated temperatures were: 227.50, 282.89, 288.27, 293.65, 299.03, 304.42, 309.80, 315.18, 320.56, 325.95, and 331.33 K. One-dimensional, variable-temperature experiments were performed using 32 transients over 16k complex points after calibrating the 90° pulse width at 30° C. Samples were equilibrated for 5 min at each temperature and a relaxation delay of 4.000 s was used between transients assuming constant spin-spin relaxation time T2. NMR spectra were processed and saved under NUTS format and processed using the program WINDNMR to estimate the exchange rates $k_{ex}$ ($k_{ab}+k_{ba}$) for 2-spin exchange, with special attention to line width for exchanging peaks. The term $k_{ex}$ is a single constant because between the two sites, the rate forward ($k_{ab}$) is equal to the rate backward ($k_{ba}$), and thus we assume equal populations in methylene peak resonances (N—$CH_2$—). An Eyring analysis plot was used to approximate the activation enthalpy and entropy of the transition state, where the best fit line in the plot was determined by linear regression. In this plot, the natural log of $k_{ex}/T$ is plotted against 1000/T.

Two-dimensional exchange spectroscopy (EXSY) was performed at 5° C., 30° C., and 55° C. using a standard Nuclear Overhauser Exchange Spectroscopy pulse sequence. The time domain data dimension of each EXSY experiment was 2048×128 (t2×t1) complex points with an exchange mixing time of 400 ms. A total of 16 transients were collected at each $t_1$ point with a relaxation delay of 30 s between transients. EXSY spectral data were processed using Mestrenova (Mestrelab Research, Santiago de Compostela, Spain) with a squared cosine apodization to a final spectral dimension of 2048×2048 points. Carbon NMR was performed in a 300-MHz ($^{13}C$ resonance frequency) Bruker spectrometer, where a standard C13CPD NMR pulse sequence was used for analog characterization, in addition to $^1H$-NMIR.

Results

Only methylene peak (i.e., —N—$CH_2$—) resonances were analyzed in the NMR study. All compounds were characterized using NMR by integration of the peaks. Collectively, the line-shapes correlate with the extent of exchange. The exchange constants were calculated at each temperature using WINDNMR software by simulating line-shapes ($k_{ex}$ in inverse seconds). A 2-spin mechanism ($k_{ab}+k_{ba}$) was used to fit two-site exchange mechanisms. High exchange constants correspond to a single peak responsible for all four a-methylene protons, based on integration of line-shapes. Low exchange constants correspond to more than one peak. Thus, peak broadening as the temperature increases means that the exchange rate between popular molecular conformations is increasing. Relative to the NMR timescale, when two peaks merge into one peak, this means that there are two favorable conformal environments, and the rate at which one interconverts into the other happens within the speed or frequency at which the sample data are collected over the temperature range at which the data are collected. In other words, the exchange constant is either slower, the same, or faster than the precession frequency of the protons that is being collected as they relax after being irradiated. Thus, a single peak for all four methylene protons is the average frequency of precession between magnetic environments that exist.

For analogs exhibiting very low exchange constants, there are virtually no changes in the line-shape, or peak broadening, as the temperature increases. These analogs are understood to be atropisomers, because only steric hindrance affects the number of diastereomers, and there is virtually no line-shape broadening of methylene peak resonances. Several analogs, including 1° C. and 3° C., showed three-site exchange, and are examples of conformational induced trapping due to steric interactions.

In the case of 5mB, $ke_x \gg \Delta V$; 3mC showed coalescence of the methylene peaks within the temperature range 5-55° C. In the case of 4mB, $k_{ex} < \Delta V$. Along with 1oC, conformation-induced trapping at lower temperatures and line-shape broadening at higher temperatures were observed in each case.

In the case of 3oB, the line-shape does not broaden within the temperature range, so there is no exchange. In 3oC, conformational induced trapping was observed at all temperatures, and no line-shape broadening was observed at higher temperatures, so there is no exchange here, either. 3oE is a mixture of distinct diastereomers, so virtually no exchange was observed. 4mD exhibits exchange and ring flexibility.

EXSY experiments provided important information about the number of distinct conformations present in the compounds analyzed. The identification of exchanging peaks was strictly limited to methylene proton groups. The analogs 1oC, 3° C., 3oE, and 4oE showed complex methylene proton (N—CH$_2$—) spin exchange mechanisms. For the analogs 1oC and 3oC (see Table 2), each showed the presence of a third trapped higher-energy conformation that was observed in variable temperature NMR spectra at 3.17 and 3.12 ppm, respectively. The chemical shift and line-shape of this third trapped higher-energy conformation for 3° C. is relatively unchanged within the experimental temperature range, and therefore, this behavior can be explained as atropisomerism (non-superimposable mirror images without a chiral center). 1oC seems to be less rigid, as there was line-shape broadening at higher temperatures. This steric effect wanes with smaller substituent groups in the ortho position, and produces no effect at all in the meta position (compare 3mC with 3° C., 1mC with 1oC, and 2mC with 2° C.). Thus, having a large group in the ortho position introduces steric interactions.

Further, the combination of a large aromatic substituent group in the ortho position with a 6-membered cyclic amine results in a higher degree of steric interaction, because no third trapped higher-energy conformations were observed in analogs with pyrrolidine (the "B" analogs in Table 2). Therefore, o-DEET has a similar exchange mechanism as 1oC and 3oC, with the exception that 3° C. also shows atropisomerism in the downfield methylene proton peaks at 3.78 and 3.70 ppm. Thus, relative to o-DEET and 1oC, 3° C. is a more rigid analog, most likely due to the strong withdrawing effects of the trifluoromethyl substituent. In the chemical shift range 3.80 to 3.10 ppm, the extent of chemical exchange is drastic between 1oC and 3° C. At 30° C., 1oC shows more line-shape broadening and exchanging of the methylene peaks (shown as cross peaks in the EXSY plot relative to the diagonal) than 3° C. There is some exchange detected in 3oC. Thus, between 1oC and 3oC, 1oC can interconvert between molecular conformations at a faster rate than 3° C. However, both 1oC and 3oC show three-site exchange characteristics, where the third site is a trapped higher-energy conformation in the chemical shift range 4.0 to 3.0 ppm for methylene proton resonances (N—CH$_2$—).

In the case of 3oE and 4oE, each analog showed the presence of two sets of distinct conformational states at lower temperatures. Here, it is believed that the methyl group in N-methylpiperazine (the "E" analogs in Table 2) is responsible for the complex exchange behavior due to 1,3-diaxial interactions, but it may be more impacted by strong electron-withdrawing aromatic substituents. All other analogs of N-methylpiperazine showed characteristics of a two-site exchange mechanism, with the exception of a large ΔV between methylene peak resonances when compared to other analogs in the series.

3oE shows a complex spin exchange mechanism in the chemical shift range 4.03 to 3.24 ppm, where two distinct sets of non-exchanging methylene proton resonances are present at 5° C. As the temperature increases, chemical exchange occurs. Here, distinct sets of methylene proton resonances are evidenced by a lack of exchange cross peaks in the 2D EXSY plot as a whole (i.e., exchange only occurs between two sets of diastereotopic protons). Thus, chemical exchange only occurs within each set of methylene proton resonances at higher temperatures, and there is no complete coalescence point for the methylene proton resonances as a whole for 3oE in the experimental temperature range. At cooler temperatures, 3oE does not undergo complete chemical exchange, and exists as a mixture of non-superimposable, non-mirror image stereoisomers due to its lack of symmetry.

A similar case arises for 4oE, where distinct sets of methylene proton resonances are evidenced by a lack of exchange cross-peaks in the 2D EXSY plot at lower temperatures. The primary difference in behavior between 4oE and 3oE are in the ΔV between one of the two sets of diastereotopic protons at cooler temperatures: set 1 proton resonances at 4.23 and 3.80 ppm with ΔV=172 Hz; set 2 proton resonances at 3.50 and 3.30 ppm with ΔV=80 Hz. The large frequency difference in the first set of proton resonances does not necessarily attribute to more restricted exchange within this subset because complete coalescence for both independent sets occurs at higher temperatures. This was not the case for 3oE. The EXSY plots of 3oE and 4oE both show two distinct conformational states.

In theory, electron withdrawing groups should cause methylene peak separation, reflecting higher activation enthalpy (i.e., C—N bond rotation energy), and electron donating groups should cause faster exchange (reflected as a single peak for methylene proton resonances) and lower activation enthalpy. Focusing on just the B and C cyclic amines in Table 2, analogs containing an electron withdrawing group and analogs containing an electron donating group sometimes both show similar exchange behavior, regardless of ortho or meta positioning.

Biological Activity

To determine whether the present DEET alternatives demonstrated repellency, olfactory and gustatory assays on *Drosophila melanogaster* were used. The olfactory and gustatory pathways have both been shown to be activated by DEET, and behavioral assays that rely on these pathways were used to screen the present insect repellents to test their efficiency. The *D. melanogaster* assays served as a model for SWD repellency. Forty different aromatic amides were studied at a 25% concentration by weight in DMSO, and the fruit fly chemosensory behaviors in response thereto were characterized. In screening the present aromatic amides, those compounds that demonstrated significant repellency were identified. Insects did not habituate to a number of the present aromatic amides.

In the olfactory assays, one-choice and 2-choice trap assays were used to test the repellency of these compounds such that the flies did not make physical contact with the test compounds. In the gustatory assay, the consumption of sugar (from a solution in a gel) treated at varying concentrations of the present repellent compounds was compared to the consumption of control-treated sugar. For the habituation assay, flies were tested over repeated exposures to the present repellent compounds to measure changes in behavioral preference for the compounds.

Olfactory Assays

Flies were monitored throughout their life cycle. Five-day-old flies (10 male and 10 females) were selected per assay, and starved for a predetermined length of time (e.g., 20 hours). After starvation, two different assays were used to study the olfactory related responses.

Figure 7A:
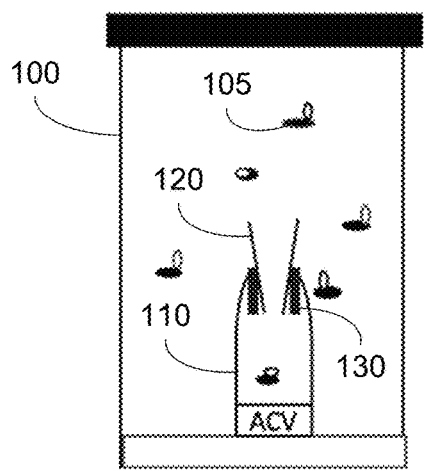
FIGS. 7A-B show exemplary assay chambers for olfactory assays.

FIG. 7A is a diagram of a single-trap olfactory assay. Flies 105 were placed in a cylindrical chamber 100 containing a trap 110. The trap 110 was fashioned from an upturned 1.5 ml micro-centrifuge tube where the tapered end was trimmed away. A pipette tip 120 was cut to form a funnel and inserted into the bottom of the inverted micro-centrifuge tube 110. Then, filter paper 130 was placed between the pipette tip 120 and tip of micro-centrifuge tube 110. The pipette tip 120 was placed so that entering flies could not make physical contact with the filter paper 130. The filter paper 130 was placed in this manner so that when the filter paper 130 was treated with the repellent solution, the flies would only be able to smell at a distance and should be repelled even in the presence of an attractant.

A 25 μl sample of test compound at 25% concentration was applied to the filter paper 130 in order to provide the odor source. At the bottom of the trap 110, 125 μl of 10% apple cider vinegar (ACV) was placed as an attractant. Trials were conducted for 24 hours to visualize the number of flies 105 entering the trap 110. Typically, flies that entered the trap 110 contacted the liquid ACV and died in the ACV. Flies were counted and recorded at 4, 6, and 24 hours. No control other than DEET was used for this experiment, because it was a single trap, comparing the number of flies 105 repelled by the repellent versus the number of flies 105 interacting with the attractant (ACV).

Some flies 105 died outside the trap 110, and the assay did not determine the exact time such flies died. Thus, some dead flies may not have had an opportunity to enter the trap 110. The assay of FIG. 7A demonstrates that no other odor is interfering with the fruit fly's interaction with the repellent and the attractant. Therefore, if the repellent compound on the filter paper 130 is more effective than DEET, then a smaller number of fruit flies, if any, interact with ACV than the same experiment with the same amount of DEET on the filter paper 130.

Figure 7B:
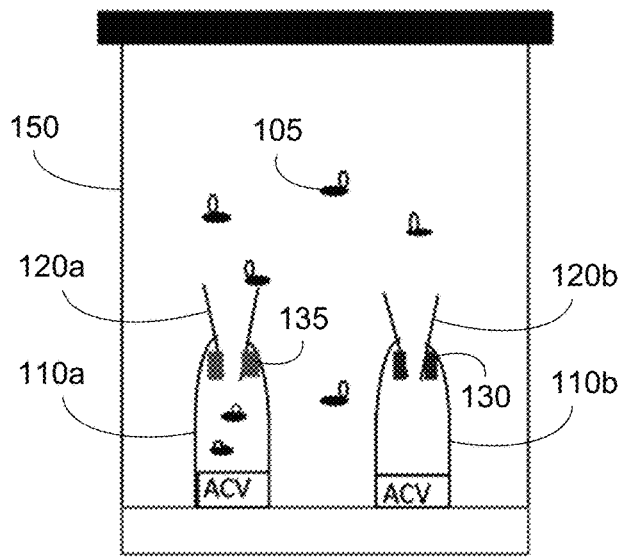

FIG. 7B is a diagram of a 2-choice trap olfactory assay. Two ACV traps 110a-b were prepared as above, in a cylinder 150 from upturned 1.5 ml micro-centrifuge tubes with the tapered end trimmed away, and a pipette tip 120a-b inserted into the inverted micro-centrifuge tube. In the cylinder 150, one trap 110a was treated with 25 μl of DMSO (as a control) on the filter paper 135, and the other trap 110b with the 25 μl of the 25% by weight solution of the test compound in DMSO applied to the filter paper 130. 125 μl of 10% ACV, diluted with water, was placed in the bottom of the traps 110a-b. Both traps contained filter paper as prepared in the one-trap assay. All trials were screened for 24 hours, and the number of flies 105 in each trap was counted. Positions of the traps (i.e., left or right, relative to the location of the chamber 150 in the room) were randomized. The number of flies 105 in each trap 110a and 110b were counted and recorded at 4, 6 and 24 hours.

The assay of FIG. 7B demonstrates that the fruit fly avoids the repellent when being supplied with another food source. Repellent compounds that demonstrate better repellency than DEET have fewer flies in the repellent-treated trap 110b in comparison to the number of flies in the DEET-treated trap 110b in an otherwise identical control experiment.

Figure 8:
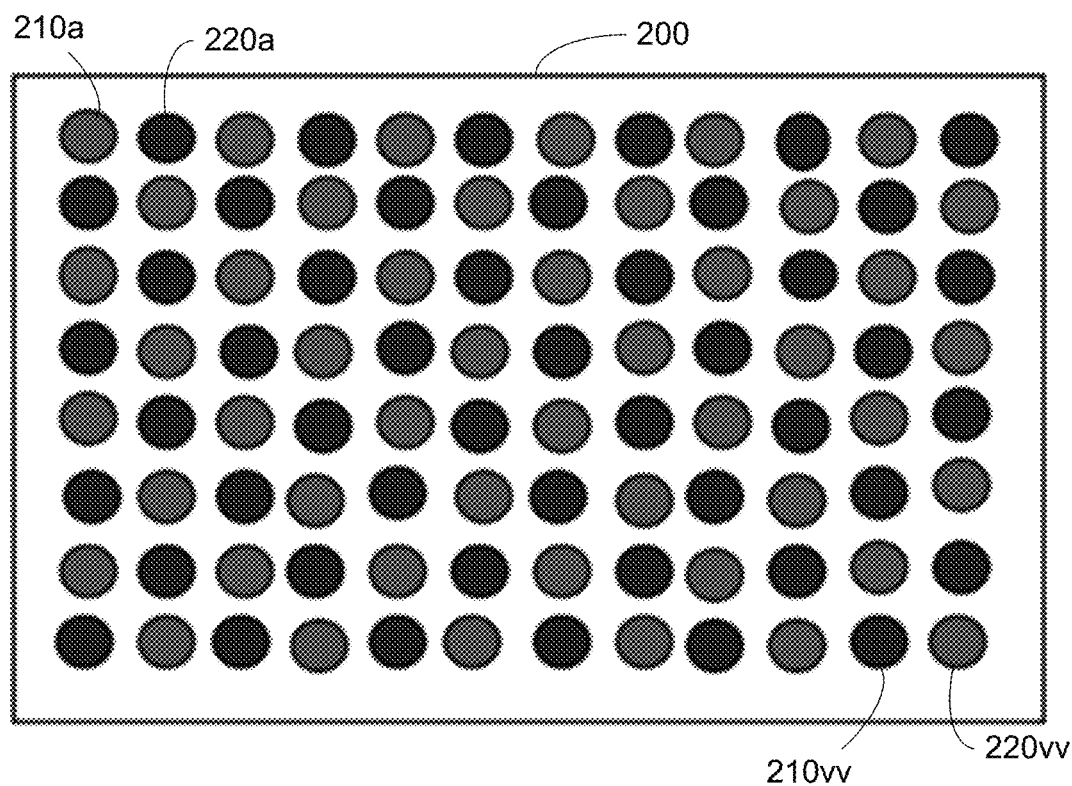
FIG. 8 shows an exemplary multi-well tray used in a gustatory assay.

Gustatory assays:

Flies were continuously monitored throughout their lifecycle. In doing so, 3- to 5-day-old flies (half male and half female) were selected and starved for 20 hours. Flies were then introduced to 96-well plates 200 with wells 210a-220vv that were alternately filled with two different sugar solutions, as shown in FIG. 8. Wells 210a-210vv were filled with 25 mM fructose in DMSO (as a control), colored with red food coloring, and wells 220a-220vv were filled with 35 mM fructose mixed with 5 mM of the present insect repellent in DMSO, colored with blue food coloring. The food coloring is nontoxic, so it has no effect on preference. Using an established protocol (Montell, C., et al., Avoiding DEET through insect gustatory receptors. *NIH Neuron* 67(4), 2010, 555-561: doi:10.1016/j.neuron.2010.07.006), flies selected between the fructose control or fructose mixed with aromatic amide repellent. Tests were performed on at least one group of about 50 males and at least one group of 50 females. Flies were placed in the dark for 1 hour, then the food coloring in the fly's abdomen was visualized under a compound microscope. The color of the abdomen was noted, along with the intensity, providing a quantitative idea of how much sugar each fly consumed, and from which type of well (control vs. mixed with repellent). The flies were fed for one hour so that the amount of food coloring was significant enough to be visible. A preference index was made to define the amount of food coloring consumed and assess the degree of repellent avoidance via gustatory processes.

Figure 9:
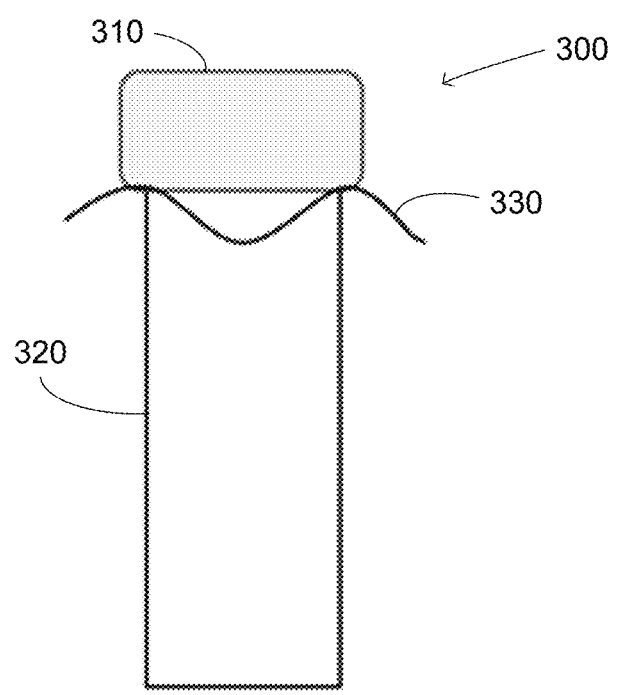
FIG. 9 shows an exemplary container for a habituation assay.

Habituation Assay:

Flies were continuously monitored throughout their lifetime. In this assay, 3- to 5-day-old flies (70 male and 70 female) were selected and transferred to an empty fly food container 320 (FIG. 9). The polystyrene foam cap 310 was treated with 50 μL of 25% by weight of the present aromatic amide repellent in DMSO. A thin porous material 330 was placed around the treated cap 310, with a gap between the cap 310 and the material 330 so that the flies cannot touch the treated cap 310, but can only smell it. Flies were then exposed to the repellent for 20 hours in the container prior to screening, while starving. After the 20-hour period, the flies were screened in the olfactory assay and gustatory assays above. In the olfactory assay, the number of flies in the trap, the number of flies outside the trap, and the number of flies that died outside the trap were counted as described herein, and in the gustatory assay, the color of the flies' abdomens were determined and counted, as described herein.

The different assays assigned results as follows. For the single-choice olfactory assay, the numbers of flies were counted according to (1) those that entered the trap, (2) those that stayed outside the trap and lived, and (3) those that died outside the trap. For the two-choice olfactory assay, the numbers of flies were counted according to (1) those that entered the control trap, (2) those that entered the trap containing the repellent, (3) those that stayed outside of both traps and lived, and (4) those that died outside the traps. For the gustatory assay, the numbers of flies were counted according to those that had (1) a red-colored abdomen, (2) a blue-colored abdomen, (3) a purple abdomen, and (4) no added color to their abdomen. A nonparametric Mann-Whitney U test was used to compare the statistical differences between assays using DEET and the same assays using one of the present repellents for all trials.

Olfactory Assay Results

Analysis of the olfactory assays suggested that many of the present compounds were as effective as or significantly more effective than DEET. The common vinegar flies were conditioned to be hungry prior to each experiment. The data were recorded at 4, 6 and 24 hours but only the data at 6 and 24 hours were analyzed. Repellents that were effective in the one-choice trap olfactory assay were effective in the presence of starved fruit flies and a detectable single food source apple cider vinegar. As for the two-choice trap assay, the starved flies had a choice between control and treated traps. The control trap was treated with an odorless and colorless solvent (DMSO), and the other was treated with the repellent compound. Thus, the two-choice olfactory assay shows how the flies react when presented with multiple odor cues. Together, the data suggest that there are several new aromatic amide compounds that are as effective as or more effective than DEET in both olfactory assays.

In the one-choice olfactory assay, the trap was set up so that the flies could only detect the repellent and the food source through olfaction. The flies' interactions with each repellent-treated food source were compared to that of DEET utilizing the Mann-Whitney U analytical test. Analysis of the one-choice trap assay results suggests that there are several compounds that are effective repellents.

Figure 10:
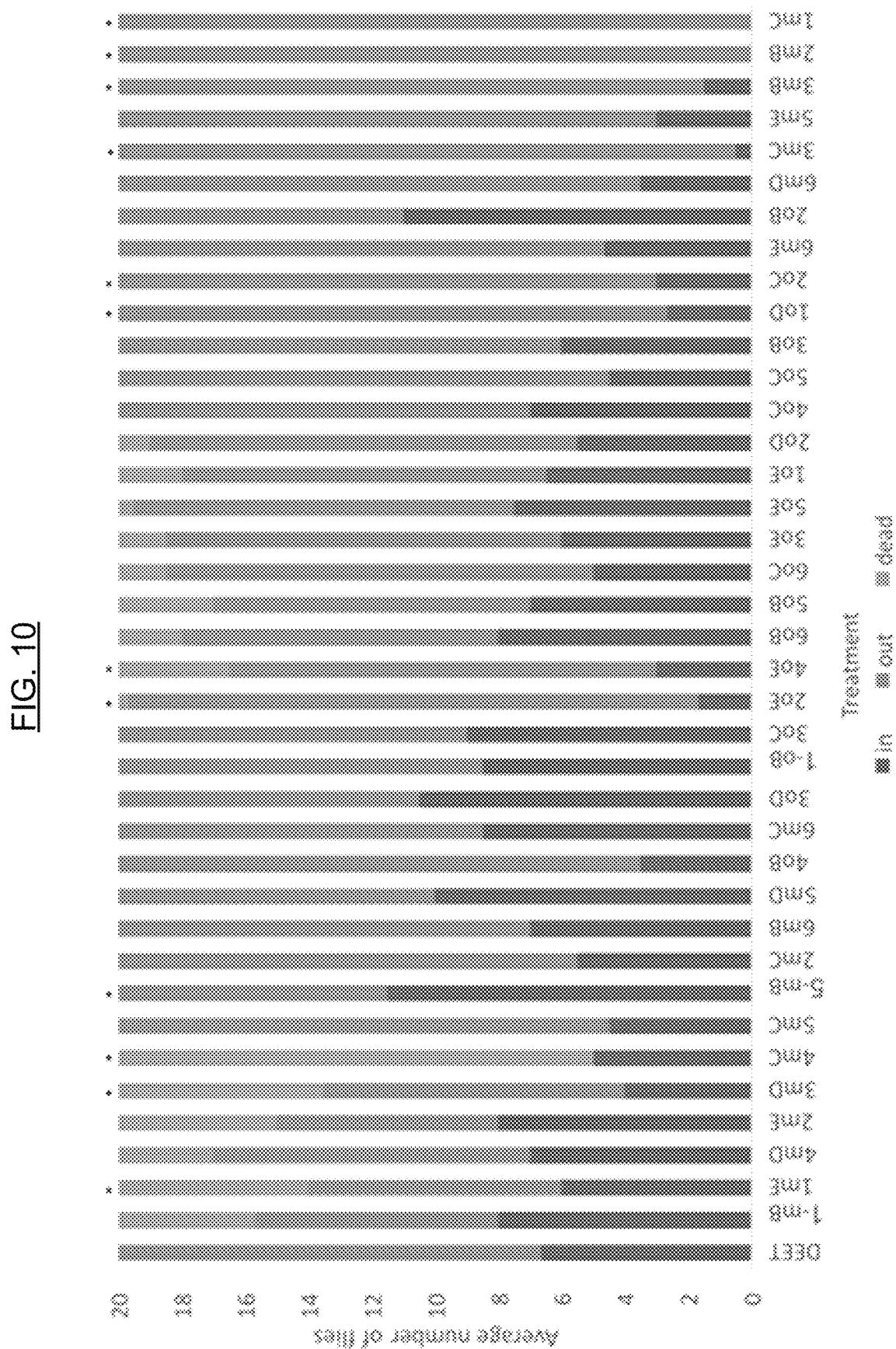
FIGS. 10 and 13 respectively show results of one-choice olfactory assays using DEET and representative compounds of the present repellents after 6 hours and 24 hours.
Figure 13:
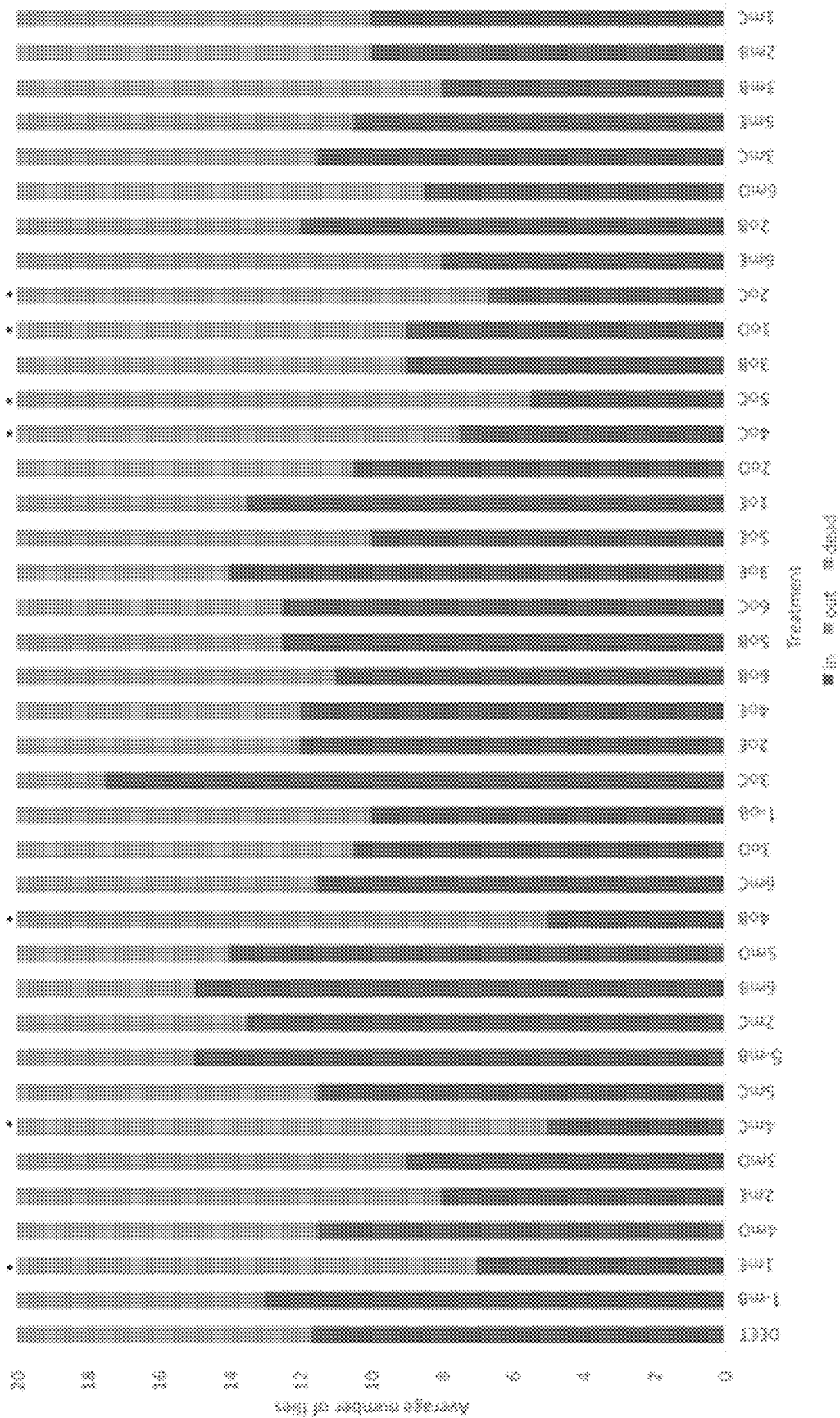

The results of the one-choice trap assays over a 6-hour period of exposure are shown in FIG. 10 and at 24 hours are shown in FIG. 13. Of the repellents tested, the following compounds were more effective than DEET: 1mC, 1mE, 1oD, 2mB, 2mC, 2oC, 2oD, 2oE, 3mB, 3mC, 3mD, 3oB, 3oE, 4mC, 4oE, 5mC, 5° C., 6° C. and 6mE. 1mE, 1oD, 2oE, 3mD and 4oE all exhibited some fly death during the 6-hour screen, possibly due to the stress of being starved in combination with the toxicity level of the repellent. However, fly mortality in the 2oE assays was relatively insignificant. Moreover, 1mC, 2mB, 2oC, 3mB and 3mC all displayed significant repellency and no fly death. 1mC and 2mB displayed 100% aversion, with no flies entering the single-choice trap. In the one-choice assay, 1mC, 2mB and 2oE were the most effective repellents. Many of the other compounds showed similar repellency to DEET, including 5mE, 4oB, and 6mD.

Compound 4mC was effective and significantly better than DEET, but exhibited high mortality in the fruit flies when the flies were exposed to the chemical in the gas phase. An average of 5 flies entered the 4mC trap, but all the flies were dead, inside and outside the trap. This could have been due to 4mC being aerosolized within 6 hours, resulting in a fatal response in the fruit flies. However, when comparing 4mC to DEET, 4mC demonstrates on average fewer flies entering the trap, but there could have been less participation in the 4mC-treated trap than in the DEET-treated trap due to the fatalities.

Figure 11:
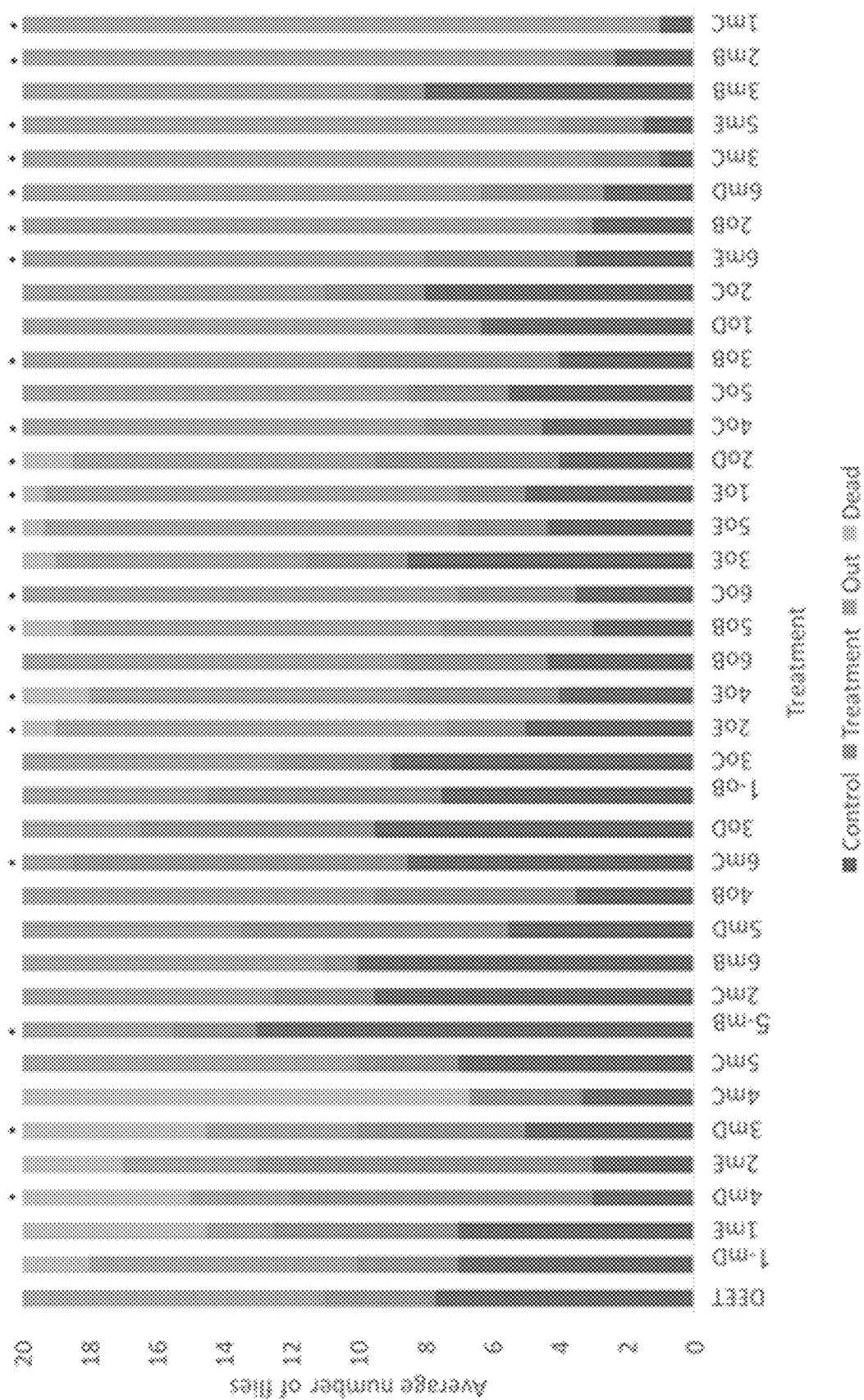
FIGS. 11 and 14 respectively show results of two-choice olfactory assays using DEET and representative compounds of the present repellents after 6 hours and 24 hours.
Figure 14:
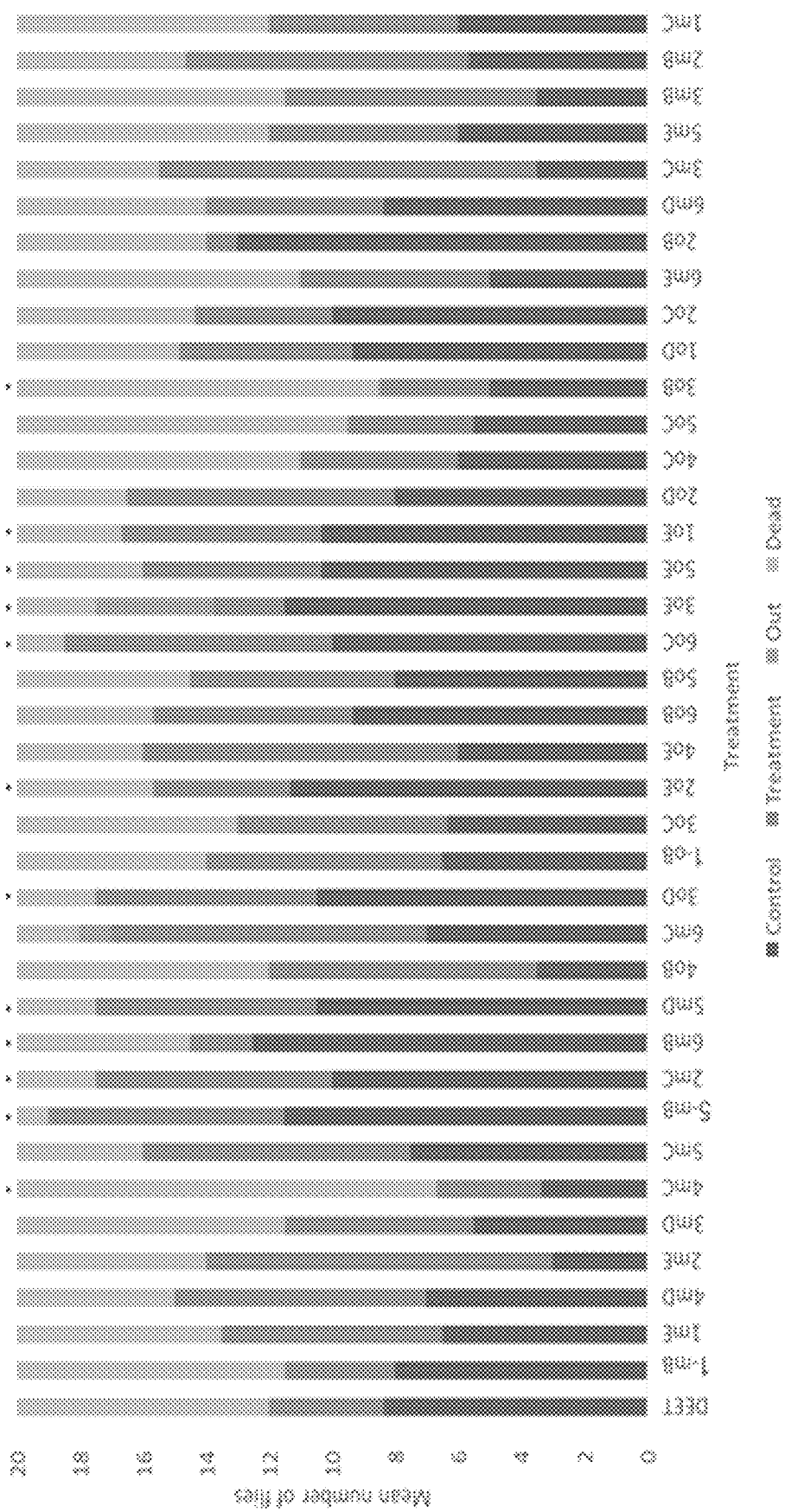

The two-choice trap olfactory assay tested flies' preference for a food source mixed with the repellent versus the food source plus solvent alone (the control-treated trap). Overall, the data suggests some compounds that are significantly more effective than DEET and a few that are statistically similar to DEET. The data for the two-choice trap olfactory assay after 6 hours' exposure are shown in FIG. 11 and after 24 hours are shown in FIG. 14.

Seven of the present repellents tested worked significantly better than DEET, as determined by the flies' demonstrating a preference for the control trap in the two-choice trap olfactory assay. For example, there was significantly greater preference for the control trap versus the 5mB-treated trap, but with a much higher mean participation in choosing either trap. Flies also preferred the control trap versus the 6mB-treated trap, with a higher mean participation. The compounds 1mC, 1oD, 1OE, 2mB, 2oB, 2oE, 3mB, 3mC, and 5mE demonstrated effectiveness not only by flies demonstrating a preference for the control trap, but also by the flies demonstrating less overall participation after 6 hours. For example, only 4 flies on average chose a trap in 6 hours in the 2mB assay, and only 1 fly on average chose a trap in 6 hours in the 1mC assay. Due to the low participation, it is difficult to quantify whether these repellents actually averted these insects. However, even with less participation, more flies interacted with the control trap in comparison with the repellent-treated trap in the 1mC, 1oE, 2oB and 2oE assays. 2mC, 2oC and 3oC showed results similar to DEET. These repellents are repelling via olfaction.

Gustatory Assay Results

Figure 12:
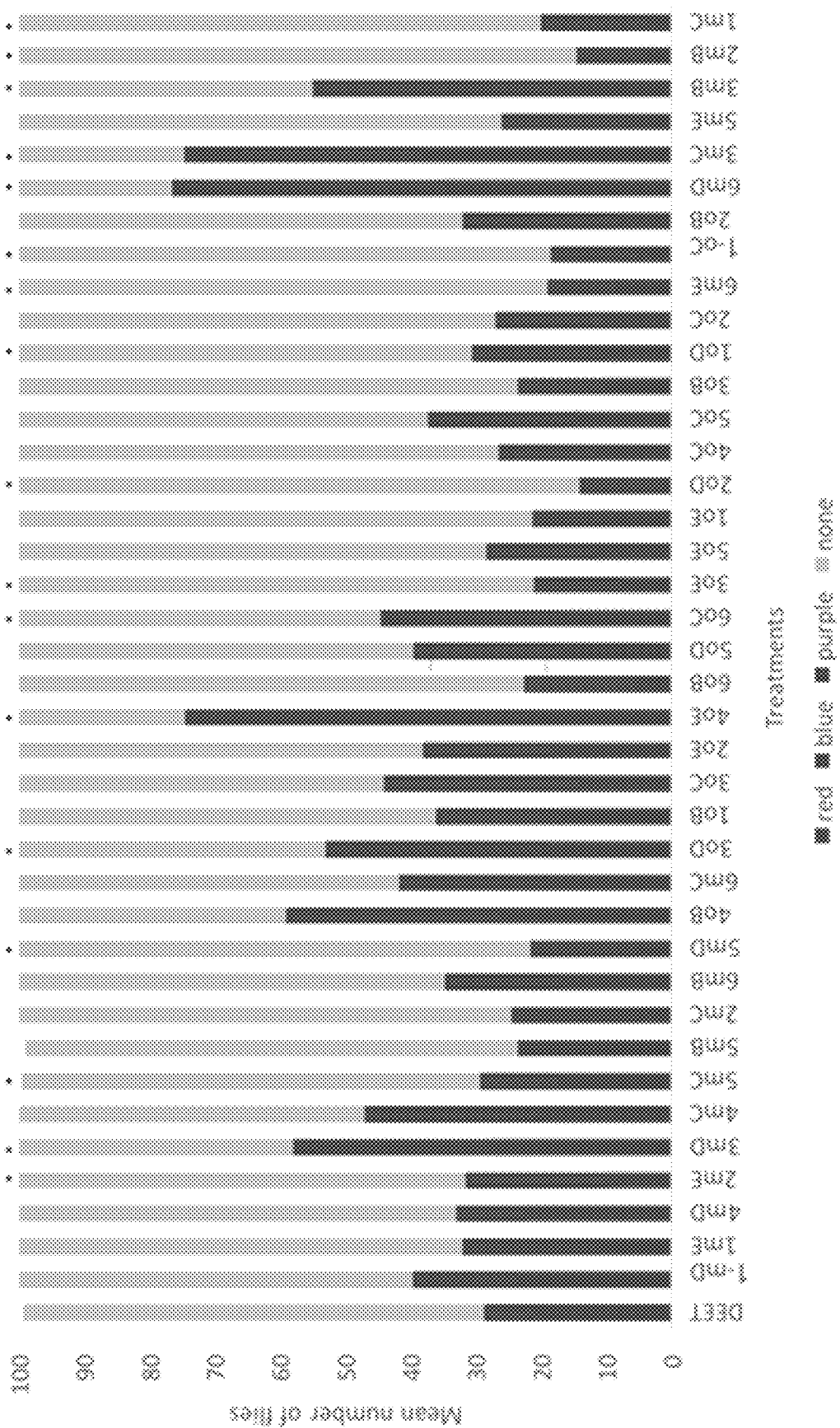
FIG. 12 shows results of gustatory assays using DEET and representative compounds of the present repellents.

Analysis of the gustatory assay suggests that there are some compounds that are more effective than DEET and many that have effectiveness similar to DEET. In analyzing this assay, the consumption of the repellent-treated sugar versus the control-treated sugar was compared by visualization of the fly's abdominal area. To visualize the source of the consumed sugar in the fly's abdomen, the sugar solutions were treated with either red (control) or blue (repellent-treated) food coloring. The food coloring is nontoxic and has no effect on food choice. The abdomen of the fruit flies (*D. melanogaster*) is transparent, and the food coloring can be seen from the exterior. However, to confirm the color of the fly's abdomen, the abdomen was dissected, and the color was visualized. Results are shown in FIG. 12.

A number of the present repellent compounds showed results significantly different from DEET. Of these, the compounds 1mD, 3mC, 4mD, 5mB and 5mC act as a gustatory repellent, because the fruit flies had decreased preference for the repellent-treated sugar sources than for the control-treated sugar sources. However, 3mC did significantly worse than DEET at repelling the fruit flies. Additionally, flies had slightly lower preference for the 5mB-treated sugar, but it was also worse than DEET at repelling the flies.

Analysis of the habituation assay suggests that there is at least one DEET analog that the insects did not habituate to after prior exposure. In analyzing the habituation assay results, earlier assays of the present repellents were compared to assays using the same repellents and the same insects in the habituation assay.

In the one-choice trap olfactory assay, 2mB was worse at repelling insects after prior exposure. Insects had similar preferences for the DEET- and 2oE-treated traps in the one-choice trap assay and habituation assay.

All repellents showed similar in repellency in the habituation assay after prior exposure in the 2-choice olfactory assay. There was no significant difference in behavior after being exposed to the repellent for an 18-hour period. Thus, the data shows that in the 2-choice assay, the flies did not habituate to any of the aromatic amide compounds, including DEET, so the flies were still repelled by all of the compounds after exposure. In this case, DEET demonstrated to have the most significant difference (Mann-Whitney U test, z=1.17, P=0.121) and the lowest p value (making it the worst repellent in this assay), but it still was statistically similar (FIG. 10). All chemicals were tested at 25% concentration by weight in the habituation assay. It is possible that the concentration was too high for the insects to habituate to the repellents under the assay conditions. However, of the two options given to the flies, the flies essentially always chose the option that did not contain the repellent.

In the gustatory assay, DEET and 2mB showed significantly less repellency in the habituation assay after prior exposure, although 2oE showed statistically similar results in the habituation assay after prior exposure. Therefore, the data suggest that fruit flies are unable to habituate to 2oE post-exposure in both olfactory and gustatory assays.

DEET and 2mB demonstrated habituation in at least one assay. Results for DEET were statistically similar in the olfactory screens, but at high concentrations, flies are less likely to habituate. Therefore, when comparing the results in the habituation assays between olfactory and gustatory screens, these results may be concentration-dependent. The olfactory assays are conducted at a concentration of 25 wt. %, while the gustatory assays are conducted at a concentration of 5 mM. In addition, DEET had a prolonged effect at a concentration of 25 wt. %, but at lower concentrations (as was observed in the gustatory assay), it did not. Therefore, prior exposure to the repellent may have a much stronger effect in the gustatory habituation assay.

The neurophysiological mechanisms of repellency were analyzed using receptors that are essential for DEET detection, Or83b and Gr33a. In receptor-modified flies, the function of these receptors is inhibited by temperature, which affects the flies' ability to detect DEET (i.e., at temperatures above about 30° C., the receptors are at least partially inhibited, and DEET thus becomes a less effective repellent). These receptors also play a role in the repellency of the most promising of the present aromatic amide compounds.

In the olfactory assays, the receptor-modified flies had an increased preference for the repellent-treated food sources. The data suggests that Or83b and Gr33a are required in fruit flies for detection of both 2oE and 2mB. Interestingly, both 2oE and 2mB were significantly less effective repellents when Or83b-modified flies are exposed to temperatures above the "knockdown" (inhibition threshold) temperature. However, in the one-choice trap olfactory assay, only 2mB was significantly less effective, while 2oE was less effective, but statistically similar, to assays with unmodified flies. Additionally, receptor-modified flies had a much higher preference for both compounds.

Figure 15:
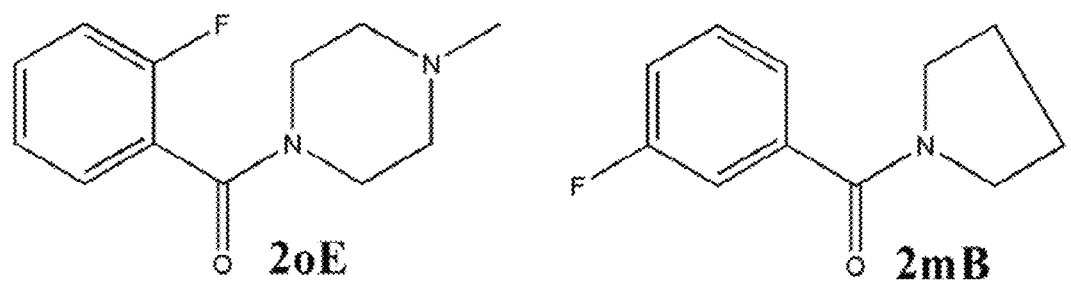
FIG. 15 shows the structures of aromatic amides 2oE 1-methyl-4-[o-fluorobenzoyl]piperazine) and 2mB (N-[m-fluorobenzoyl]pyrrolidine).

As for the gustatory assay, only 2mB was significantly less effective with receptor-modified flies, but the flies had an increased preference for both repellent-treated food sources post-knockdown. Moreover, both 2oE and 2mB were significantly less effective after Or83b knockdown in at least one of the olfactory assays, and Gr33a knockdown resulted in a higher preference for repellent-treated food. Thus, the data suggest that 2oE and 2mB (the structures of which are shown in FIG. 15) are effective repellents for insects having Or83b and Gr33a receptors. There is evidence that suggests that olfactory and gustatory neural circuitry is at least partially conserved throughout *Drosophila*.

Methods of Protecting Fruit Crops and Repelling Flying Insects

Aspects of the invention concern methods of protecting fruit crops from flying insect pests and of repelling flying insects using the present aromatic amide compounds. The methods generally comprise applying the aromatic amide compound to the fruit crops, to the ground or structures adjacent to the fruit crops, or to an object, article, human skin or animal. The present aromatic amide compounds may have a sufficiently low toxicity to be applied directly to the fruit crops to keep flying insect pests such as fruit flies (e.g., of the genus *Drosophila*) away from the crops. Some of the present aromatic amide compounds may have a sufficiently low toxicity to be applied directly to human skin or animals.

In various embodiments of the method of protecting fruit crops, the compound is applied by spraying a solution or suspension of the compound on the fruit crops, the ground, or the structures. The solution or suspension may comprise the aromatic amide compound in water. Other components, such as a dispersant, an emulsifier, an adjuvant (such as an adhesive agent or a spreading agent), a stabilizer, a safener, a dye, one or more additional solvents (e.g., ethanol, toluene, xylene[s], etc.), etc., may be present in the formulation (e.g., the solution or suspension of the aromatic amide compound). The concentration of the aromatic amide compound in the formulation may be in the range of 0.1-1000 g/L (e.g., 1-500 g/L), although values outside this range may also be suitable. Equipment and more detailed spraying techniques are described in Jenkins, E., et al., eds., "Fruit Crop Pest Management: A Guide for Commercial Applicators, Category 1C," Michigan State University Extension, E. Lansing, M I, 2017, the relevant portions of which are incorporated herein by reference.

In various examples, the aromatic amide compound can, in many cases, be applied in concentrated or dilute formulations directly to the skin of a human or animal in need or protection against flying insects, such as mosquitoes and gnats. For example, a formulation of the 10-40% by weight of present aromatic amide in distilled and/or deionized water (or a physiologically acceptable and/or isotonic buffer) may be applied directly to the skin, by spraying, by application using a tissue or cloth, in an emulsion (e.g., as a cream), etc.

A Method of Making Aromatic Amides

Yet another aspect of the invention relates to a method of making the present aromatic amide compound, comprising reacting an aromatic carboxylic acid having a formula $R_xC_6H_y$—C(=O)—OH with a chlorinating agent to form an aromatic carboxylic acid chloride having a formula $R_xC_6H_y$—C(=O)—Cl, and subsequently reacting the aromatic carboxylic acid chloride with an amine having a formula H—N(Cy) to form the aromatic amide compound.

For example, the chlorinating agent may comprise thionyl chloride, although other chlorinating agents, such as oxalyl chloride, sulfur dichloride, phosphorus trichloride, phosphorus oxychloride ($POCl_3$), and phosphorus pentachloride may also be acceptable. The aromatic carboxylic acids are generally commercially available, or within the ability of one skilled in the art to synthesize from known, readily available precursors and reagents.

In general, forming the aromatic carboxylic acid chloride is conducted in reaction vessel or chamber under dry (e.g., water-free or anhydrous) conditions, and comprises heating the aromatic carboxylic acid and a molar excess of the chlorinating agent. Optionally, the reaction may be performed in a non-reactive organic solvent (e.g., toluene, xylene[s], dioxane, dimethyl sulfoxide, etc.), but it can also be performed without solvent. The mixture of the aromatic carboxylic acid and the chlorinating agent may be heated to reflux and/or a temperature of 100-200° C. for 1-4 h, although the invention is not limited to these temperature and time ranges. Excess chlorinating agent (when liquid and/or volatile) and any HCl byproduct present may be removed using reduced pressure at ambient/room temperature.

Forming the aromatic amide compound may be conducted at a temperature of from −40° C. to 80° C. or any temperature or range of temperatures therein (e.g., room temperature) for a length of time of 1-120 min, although the invention is not limited to these temperature and time ranges. Amide formation may be conducted in a non-reactive solvent (e.g., a $C_6$-$C_{10}$ hydrocarbon, such as hexane, benzene, toluene, etc., a $C_1$-$C_4$ halogenated hydrocarbon, such as $CH_2Cl_2$ or $CHCl_3$, a $C_4$-$C_6$ ether such as diethyl ether, methyl t-butyl ether, dimethoxyethane or dioxane, etc.). A molar excess (e.g., 1.1-2.0 equivalents) of the cyclic amine may be used. After completion, the reaction mixture containing the aromatic amide may be washed with dilute aqueous base (e.g., 0.1-3 M aqueous ammonium hydroxide or MOH, where M is an alkali metal) to remove any excess acid (e.g., HCl), then optionally with small portions of deionized water and/or brine solution. The reaction mixture can be dried using a desiccant (e.g., $CaSO_4$, $MgSO_4$, etc.). Any solvent present may be removed (e.g., by reduced pressure). The aromatic amide product can be used without purification, or may be purified by column chromatography or crystallization.

Amino-substituted aromatic amide compounds (e.g., where R=$NH_2$, such as 6mB-E and 6oB-E in Table 2 above) may be prepared by reduction of the corresponding nitrobenzoyl amide compound, synthesized using the procedure described above. Generally, the reduction comprises a catalytic hydrogenation of the nitro-substituted aromatic amide. The catalyst is generally a commercially available hydrogenation catalyst, such nickel, platinum, palladium or an oxide thereof on an inert support, such as Pd on C, Raney nickel, etc. Alternatively, a rhodium catalyst, such as chloridotris(triphenylphosphine)rhodium (RhCl[$PPh_3$]$_3$) or hydridotetrakis(triphenylphosphine)rhodium (HRh[$PPh_3$]$_4$), may be used. From 0.1 to 10 mol % of the catalyst relative to the nitroaromatic amide may be used, but the invention is not limited to this range. The reduction may be carried out in a $C_1$-$C_4$ alcohol, such as methanol, ethanol or t-butanol, or other appropriate organic solvent. Hydrogen gas may be supplied by a bubbler, a pressurizable vessel, or a gas container such as a rubber balloon filled with hydrogen gas. The atmosphere in the reaction vessel may be purged (e.g., 1-5 times) with hydrogen and/or an inert gas (e.g., nitrogen). The reaction may be conducted from 4 to 24 hours or more, until completed. To determine completion, the hydrogenation reaction may be monitored by thin layer chromatography and/or other analytical techniques (e.g., gas chromatography, nuclear magnetic resonance spectroscopy, etc.). The catalyst may be removed by filtration, optionally through a pad or support (e.g., diatomaceous earth). The solvent may be removed under reduced pressure (e.g., by rotary evaporation), and the resulting crude amino-substituted aromatic amide may be purified using conventional column chromatography.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A method of protecting fruit crops from flying insect pests, comprising applying a compound having a formula $R_xC_6H_y$—C(=O)—N(Cy) to the fruit crops or to ground or structures adjacent to the fruit crops, wherein:
   $R_xC_6H_y$ is a substituted phenyl group,
   each R group is independently selected from $C_1$-$C_6$ alkyl, $C_1$-$C_4$ alkyl substituted with 1 to 2n+1 halogen atoms (where n=the number of C atoms in the $C_1$-$C_4$ alkyl group) or a $C_1$-$C_4$ alkoxy group, $C_6$-$C_{10}$ aryl, $C_6$-$C_{10}$ aryl substituted with 1-5 halogen atoms or 1 or 2 $C_1$-$C_4$ alkoxy groups, $C_1$-$C_4$ alkoxy, $C_6$-$C_{10}$ aryloxy, halogen, nitro, cyano, cyanate, isocyanate, nitroso, $C_1$-$C_4$ alkylthio, phenylthio, unsubstituted $C_1$-$C_4$ alkylsulfonyl, $C_1$-$C_4$ alkylsulfonyl substituted with 1 to 2n+1 halogen atoms, phenylsulfonyl, tolylsulfonyl, amino, mono-$C_1$-$C_4$ alkylamino, di-$C_1$-$C_4$ alkylamino, diphenylamino, di-$C_1$-$C_4$ alkylamido, formyl, $C_2$-$C_7$ acyl, or $C_1$-$C_6$ alkoxycarbonyl;
   x is an integer of from 1 to 5 and x+y=5;
   Cy is a $C_2$-$C_8$ substituted or unsubstituted alkadiyl or a substituted or unsubstituted diyl of the formula —($CH_2CH_2$)—O—($CH_2CH_2$)—, —($CH_2CH_2$)—NR'—($CH_2CH_2$)— or —($CH_2CH_2$)—S—($CH_2CH_2$)—, that, along with the N atom in the amide group in the formula, forms a substituted or unsubstituted non-aromatic cyclic group; and
   R' is $C_1$-$C_6$ alkyl, substituted $C_1$-$C_4$ alkyl, substituted or unsubstituted $C_6$-$C_{10}$ aryl, or substituted or unsubstituted benzyl.

2. The method of claim 1, wherein the compound is applied to the fruit crops.

3. The method of claim 1, wherein the compound is applied by spraying a solution or suspension of the compound on the fruit crops, the ground, or the structures.

4. The method of claim 1, wherein x is 1 or 2.

5. The method of claim 1, wherein Cy, together with the N atom in the —C(=O)—N group, forms a mono- or polycyclic heterocycle selected from pyrrolidine, pyrimidine, 1,2,3-trihydroindole, 1,2,3-tetrahydroisoquinoline, decahydroquinoline, decahydroisoquinoline, tetrahydropyrazine, morpholine, thiomorpholine, hexahydroazepine, azocane and azonane.

6. The method of claim 5, wherein Cy, together with the N atom in the —C(=O)—N group, forms a pyrrolidine, pyrimidine, tetrahydropyrazine, or morpholine ring.

7. The method of claim 1, wherein Cy is unsubstituted.

8. The method of claim 4, wherein each R is $C_1$-$C_6$ alkyl, $C_1$-$C_4$ alkyl substituted with 1 to 2n+1 halogen atoms (where n=the number of C atoms in the $C_1$-$C_4$ alkyl group), $C_1$-$C_4$ alkoxy, halogen, nitro, cyano, $C_1$-$C_4$ alkylthio, $C_1$-$C_4$ alkylsulfonyl, amino, mono-$C_1$-$C_4$ alkylamino, or di-$C_1$-$C_4$ alkylamino.

9. The method of claim 8, wherein each R is $C_1$-$C_4$ alkyl, trifluoromethyl, $C_1$-$C_4$ alkoxy, fluoro, chloro, nitro, or amino.

10. The method of claim 9, wherein x is 1 and R is at an o-position or an m-position.

11. The method of claim 2, wherein the compound is applied by spraying a solution or suspension of the compound on the fruit crops.

12. The method of claim 1, wherein x is 1.

13. The method of claim 12, wherein R is F.

14. The method of claim 13, wherein Cy is an unsubstituted diyl of the formula —($CH_2CH_2$)—NR'—($CH_2CH_2$)—, and R' is an unsubstituted $C_1$-$C_6$ alkyl.

15. The method of claim 12, wherein R is at an o-position or an m-position.

16. The method of claim 12, wherein Cy is an unsubstituted $C_4$-$C_5$ alkadiyl or an unsubstituted diyl of the formula —($CH_2CH_2$)—NR'—($CH_2CH_2$)—, where R' is an unsubstituted $C_1$-$C_6$ alkyl.

17. The method of claim 1, wherein Cy is —($CH_2CH_2$)—NR'—($CH_2CH_2$)—, where R' is an unsubstituted $C_1$-$C_6$ alkyl.

18. The method of claim 17, wherein R' is —$CH_3$.

19. The method of claim 1, wherein Cy is an unsubstituted $C_4$-$C_5$ alkadiyl.

20. The method of claim 19, wherein R is F.

\* \* \* \* \*